US011287380B2

(12) United States Patent
Akasaka

(10) Patent No.: US 11,287,380 B2
(45) Date of Patent: Mar. 29, 2022

(54) APPARATUS FOR DETECTING ABNORMAL CELLS USING FLUORESCENT IMAGE ANALYSIS AND METHOD FOR THE SAME

(71) Applicant: SYSMEX CORPORATION, Kobe (JP)

(72) Inventor: Yuki Akasaka, Kobe (JP)

(73) Assignee: SYSMEX CORPORATION, Hyogo (JP)

( * ) Notice: Subject to any disclaimer, the term of this patent is extended or adjusted under 35 U.S.C. 154(b) by 0 days.

(21) Appl. No.: 16/204,443

(22) Filed: Nov. 29, 2018

(65) Prior Publication Data

US 2019/0162666 A1 May 30, 2019

(30) Foreign Application Priority Data

Nov. 30, 2017 (JP) .............................. JP2017-230115

(51) Int. Cl.
*G01N 15/14* (2006.01)
*G06T 7/00* (2017.01)
(Continued)

(52) U.S. Cl.
CPC ..... *G01N 21/6458* (2013.01); *G01N 15/1434* (2013.01); *G01N 15/1459* (2013.01);
(Continued)

(58) Field of Classification Search
None
See application file for complete search history.

(56) References Cited

U.S. PATENT DOCUMENTS

2007/0154931 A1\* 7/2007 Radich ................. C12Q 1/6886
435/6.11
2010/0160417 A1\* 6/2010 Lawrence ............ C12N 15/113
514/44 R
(Continued)

FOREIGN PATENT DOCUMENTS

CN    102053057 A    5/2011
CN    103649717 A    3/2014
(Continued)

OTHER PUBLICATIONS

Siu Lisa LP et al: "Application of tri-colour, dual fusion fluorescence in situ hybndization (FISH) system for the characterization of BCR-ABL1 fusion in chronic myelogenous leukaemia (CML) and residual disease monitoring", BMC Blood Disorders, Biomed Central Ltd.,London, GB,vol. 9, Jul. 7, 2009 (Jul. 7, 2009), pp. 1-9; Cited in the extended European search report dated Feb. 27, 2019 in a counterpart European patent application.
(Continued)

*Primary Examiner* — Idowu O Osifade
(74) *Attorney, Agent, or Firm* — Crowell & Moring LLP

(57) ABSTRACT

An image analysis apparatus and an image analysis method capable of appropriately analyzing whether an analysis target cell is an abnormal cell even when a subject has a chromosomal abnormality are provided. An image analysis apparatus 10 includes light sources 121 and 122 configured to irradiate light onto a sample 21 whose target portion is labeled, an imaging unit 154 for capturing light generated from the sample 21 by irradiation with light, and a processing unit 11 that processes the image captured by the imaging unit 154. The processing unit 11 acquires information on the chromosomal abnormality and analyzes the image based on the information on the acquired chromosome abnormality.

16 Claims, 24 Drawing Sheets

(51) Int. Cl.
*G01N 21/64* (2006.01)
*G01N 15/10* (2006.01)

(52) U.S. Cl.
CPC ..... *G01N 15/1463* (2013.01); *G01N 15/1475* (2013.01); *G06T 7/0012* (2013.01); *G01N 2015/1006* (2013.01); *G01N 2015/144* (2013.01); *G01N 2015/1465* (2013.01); *G01N 2021/6419* (2013.01); *G01N 2021/6421* (2013.01); *G01N 2021/6441* (2013.01); *G06T 2207/10064* (2013.01); *G06T 2207/30004* (2013.01)

(56) References Cited

U.S. PATENT DOCUMENTS

| | | | |
|---|---|---|---|
| 2010/0322502 A1* | 12/2010 | Otsuka | G06T 7/0012 382/133 |
| 2011/0082049 A1 | 4/2011 | Endress et al. | |
| 2011/0104744 A1 | 5/2011 | Ozasa et al. | |
| 2014/0154793 A1 | 6/2014 | Naito et al. | |
| 2015/0119327 A1* | 4/2015 | Muotri | A61K 31/4045 514/8.6 |
| 2016/0340636 A1 | 11/2016 | Tabata et al. | |
| 2017/0122869 A1 | 5/2017 | Yoshikawa | |
| 2017/0152552 A1 | 6/2017 | Takahashi et al. | |
| 2018/0086829 A1* | 3/2018 | Zhang | C12N 15/1138 |
| 2020/0005459 A1* | 1/2020 | Berezhna | G06K 9/00147 |
| 2020/0152289 A1* | 5/2020 | Cleary | G16B 50/50 |
| 2020/0232019 A1* | 7/2020 | Erber | C12Q 1/6827 |

FOREIGN PATENT DOCUMENTS

| | | |
|---|---|---|
| CN | 106168571 A | 11/2016 |
| CN | 106645713 A | 5/2017 |
| CN | 107034269 A | 8/2017 |
| JP | 2005-515408 A | 5/2005 |
| JP | 6231709 B1 | 11/2017 |

OTHER PUBLICATIONS

Du Qinghua et al: "Calibration of interphase fluorescence in situ hybridization cutoff by mathematical models: Calibration of Interphase FISH Cutoff by Mathematical Models", NIH Public Access Author Manuscript,vol. 89, No. 3,Nov. 18, 2015 (Nov. 18, 2015), pp. 239-245; Cited in the extended European search report dated Feb. 27, 2019 in a counterpart European patent application.

The Extended European search report dated Feb. 27, 2019 in a counterpart European patent application No. 18208261.0.

L. LP Siu et al., "Application of tri-colour, dual fusion fluorescence in situ hybridization (FISH) system for the characterization of BCR-ABL1 fusion in chronic myelogenous leukaemia (CML) and residual disease monitoring", BMC Blood Disorders, Jul. 7, 2009, vol. 9, No. 4, pp. 1-6, BioMED Central.

T. Shinohara, "Leukemia and Chromosome Analysis", Juntendo Medical Journal, 1990, vol. 36, No. 1, pp. 29-45, Juntendo Medical Society.

The Japanese Office Action dated Apr. 27, 2021 in a counterpart Japanese patent application No. 2017-230115.

The Communication pursuant to Article 94(3) dated Aug. 13, 2021 in a counterpart European patent application No. 18208261.0.

The Chinese Office Action dated Oct. 22, 2021 in a counterpart Chinese patent application No. 201811367389.8.

The Japanese Office Action dated Nov. 30, 2021 in a counterpart Japanese patent application No. 2017-230115.

\* cited by examiner

First Embodiment

FIG. 3A  BCR-ABL negative, normal
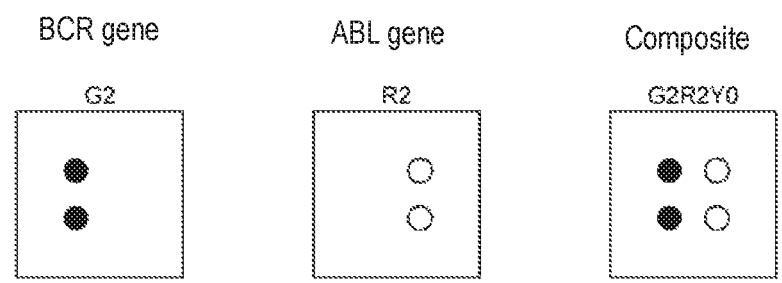
FIG. 3B  BCR-ABL positive, normal
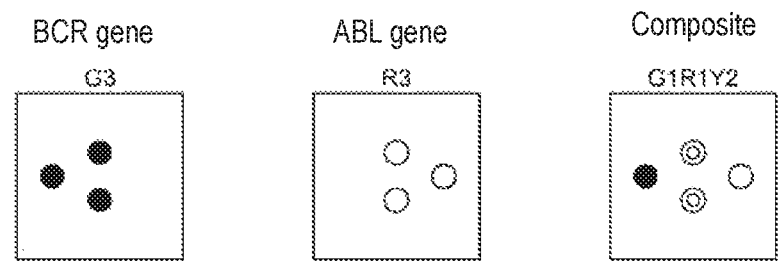

FIG. 4A BCR-ABL negative, chromosome 9 long arm loss
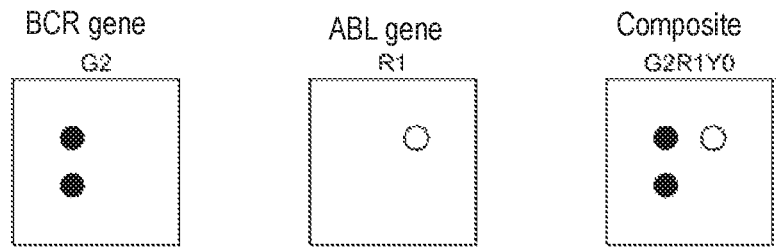
FIG. 4B BCR-ABL positive, chromosome 9 long arm loss
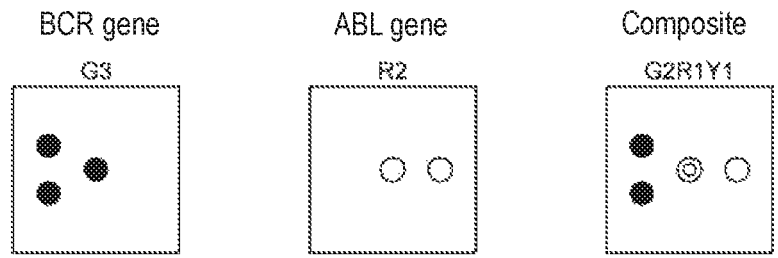
FIG. 4C BCR-ABL negative, chromosome 22 long arm insertion anomaly
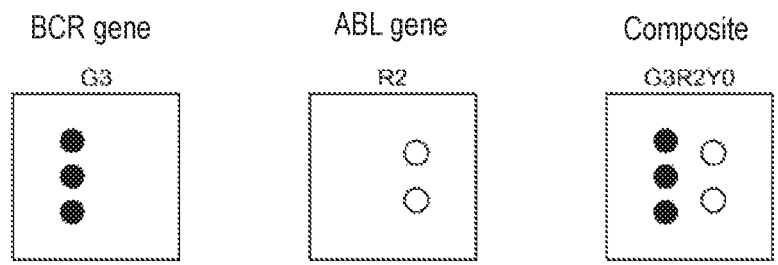
FIG. 4D BCR-ABL positive, chromosome 22 long arm insertion anomaly
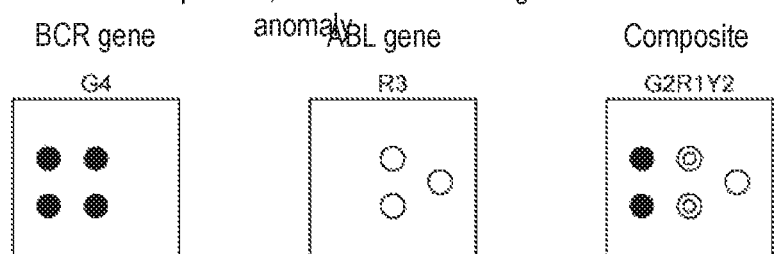

FIG. 5A  PML-RARα negative, normal
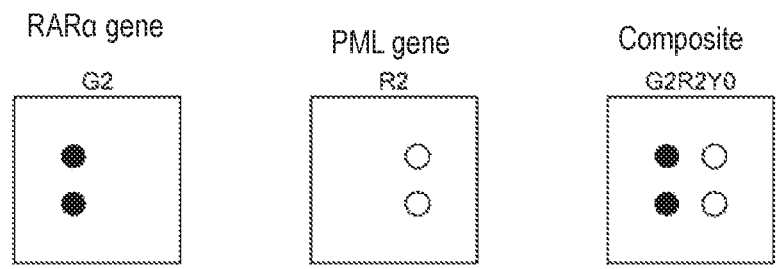
FIG. 5B  PML-RARα positive, normal
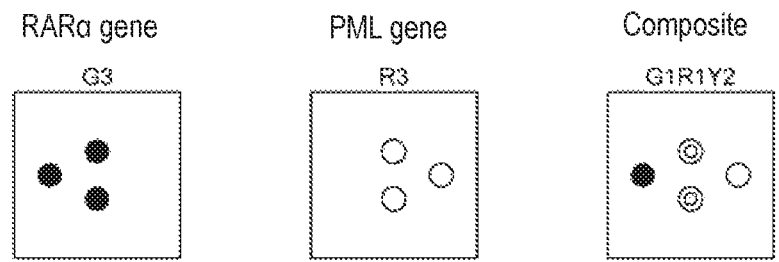

FIG. 6A  PML-RARα negative, chromosome 17 long arm loss
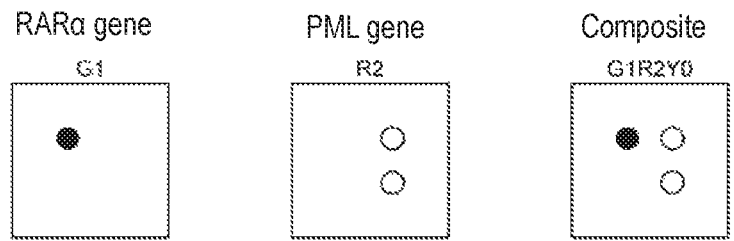
FIG. 6B  PML-RARα positive, chromosome 17 long arm loss
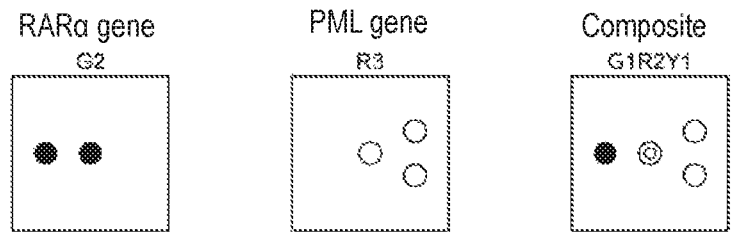
FIG. 6C  PML-RARα negative, chromosome 17 insertion anomaly
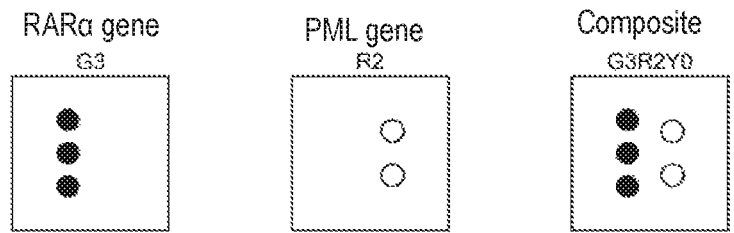
FIG. 6D  PML-RARα positive, chromosome 17 insertion anomaly
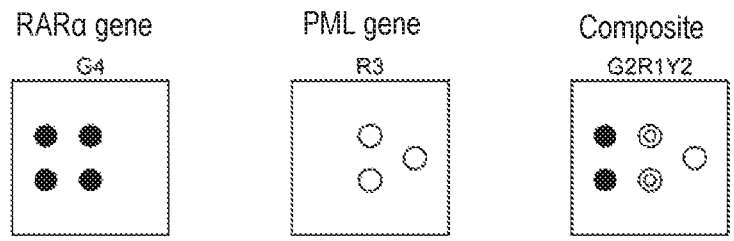

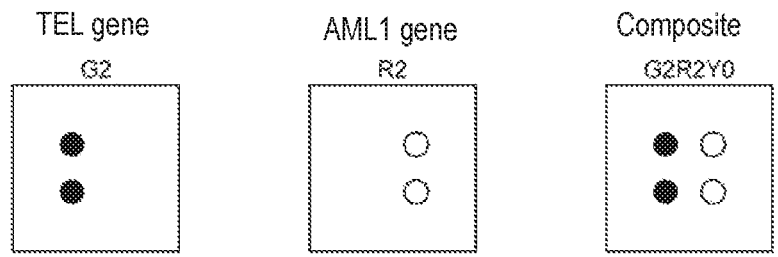
FIG. 7A  TEL-AML1 negative, normal
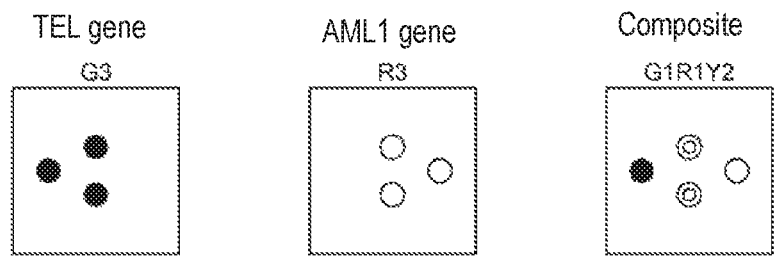
FIG. 7B  TEL-AML1 positive, normal
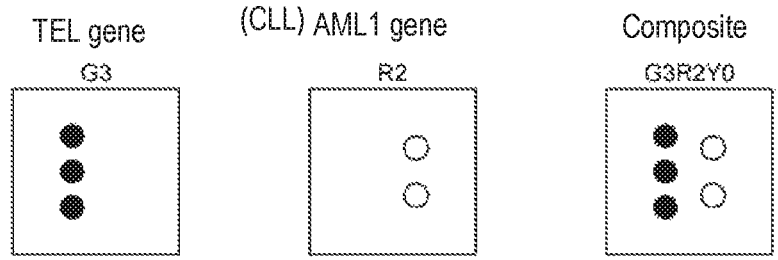
FIG. 7C  TEL-AML1 negative, chronic lymphocytic leukemia (CLL)
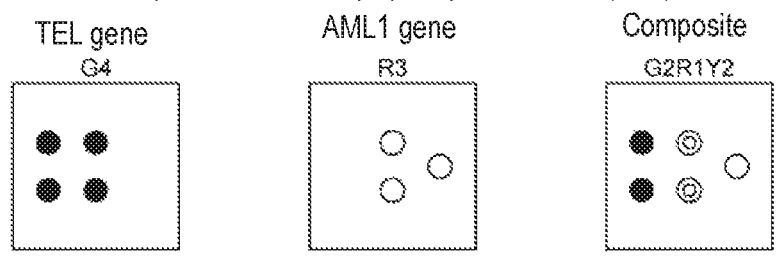
FIG. 7D  TEL-AML1 positive, chronic lymphocytic leukemia (CLL)

FIG. 8A  AML1-ETO negative, normal
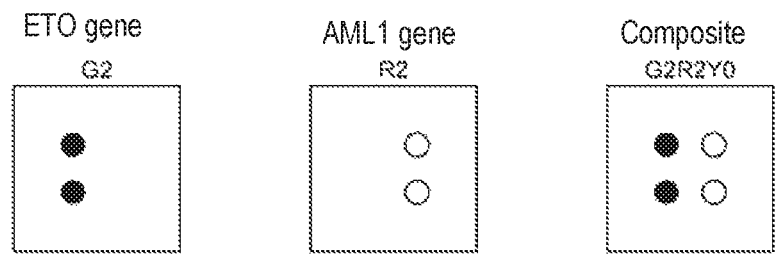
FIG. 8B  AML1-ETO positive, normal
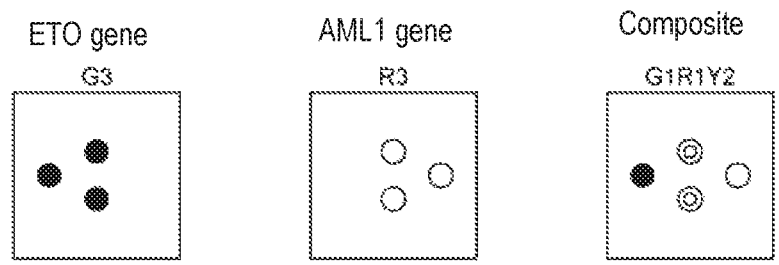
FIG. 8C  AML1-ETO negative, acute myelogenous leukemia (AML)
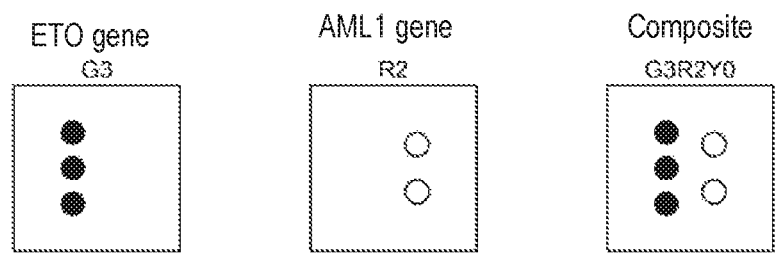
FIG. 8D  AML1-ETO positive, acute myelogenous leukemia (AML)
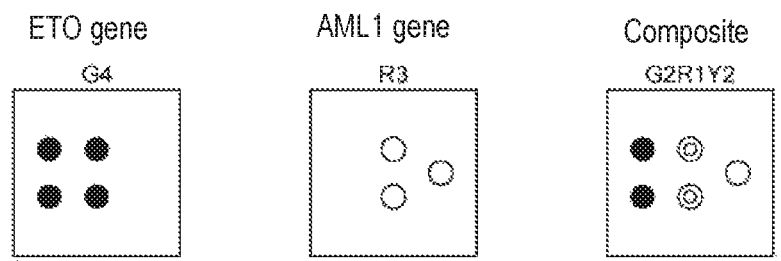

FIG. 9A sex chromosome, male, normal
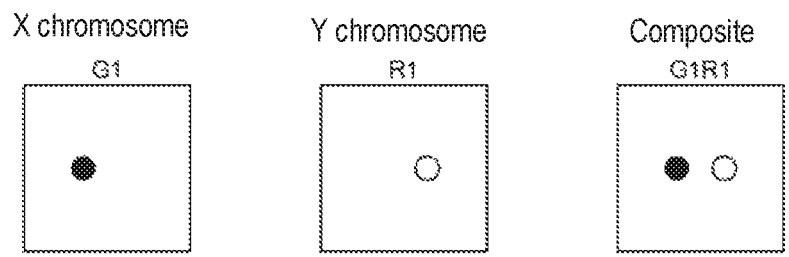
FIG. 9B sex chromosome, female, normal
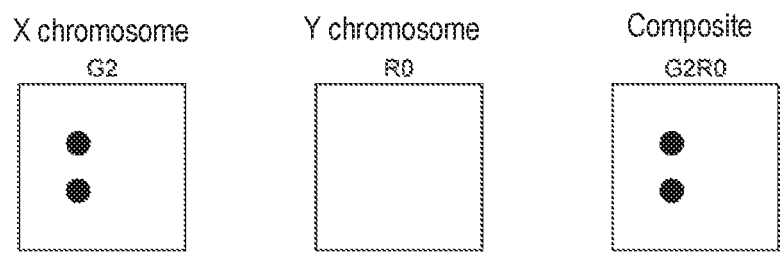
FIG. 9C sex chromosome, male, bone marrow transplant between opposite sexes
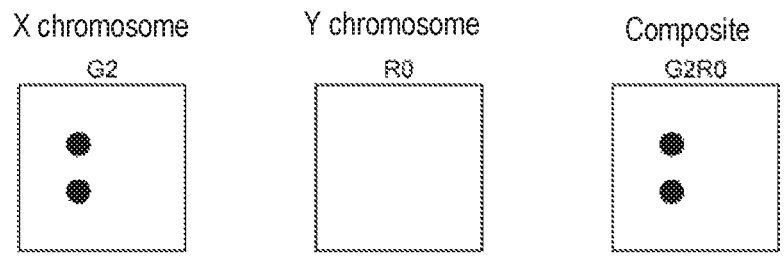
FIG. 9D sex chromosome, female, none marrow transplant between opposite sexes
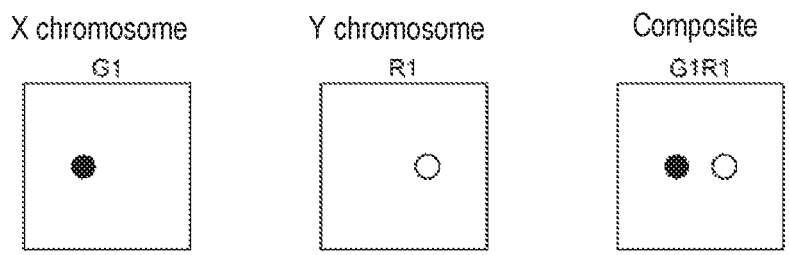

Second embodiment

Third embodiment

FIG. 22

| Sample ID | Measurement item | Ratio of abnormal cells % | Ratio of indeterminable cells % |
|---|---|---|---|
| 001234 | BCR-ABL | 1 | 10 |
| 001235 | BCR-ABL | 1 | 3 |
| 001236 | PML-RARα | 1 | 2 |
| 001237 | PML-RARα | 2 | 4 |
| 001238 | TEL-AML1 | 1 | 2 |
| 001239 | TEL-AML1 | 2 | 96 |
| 001240 | AML1-ETO | 95 | 10 |
| 001241 | AML1-ETO | 1 | 1 |

Display full image

APPARATUS FOR DETECTING ABNORMAL CELLS USING FLUORESCENT IMAGE ANALYSIS AND METHOD FOR THE SAME

RELATED APPLICATIONS

This application claims priority from prior Japanese Patent Application Publication No. 2017-230115, filed on Nov. 30, 2017, entitled "Image Analysis Apparatus and Image Analysis Method", the entire contents of which are incorporated herein by reference.

BACKGROUND OF THE INVENTION

1. Field of the Invention

The invention relates to an image analysis apparatus and image analysis method.

2. Description of the Related Art

Japanese Patent Application Publication No. 2005-515408 describes a cell processing method when a flow cytometer or the like is applied for detection of a fluorescence in situ hybridization method (FISH method). According to the FISH method, cells are stained by a pretreatment in which a labeled probe is hybridized with a detection target DNA sequence region in a cell, and abnormal cells are detected by detecting fluorescence caused by the labeled probe.

SUMMARY OF THE INVENTION

In detection of abnormal cells, for example, light generated based on a target site is imaged by an imaging unit. Then, the bright spots in the captured image are analyzed, and whether each cell is an abnormal cell it is determined based on the analysis result of the bright spots. However, the bright spots in the image change not only depending on whether the cell is an abnormal cell, but also may change depending on a gene mutation or disease of the subject. As described above, if the subject changes the bright spot in the image, it may be impossible to properly analyze whether the cell is an abnormal cell.

A first aspect of the present invention relates to an image analysis apparatus. An image analysis apparatus (10) according to this aspect includes a light source (121, 122) that irradiates light on a sample (21) having a labeled target site, an imaging unit (154) configured to capture light generated from the sample by irradiating light, and a processing unit (11) for processing the image captured by the imaging unit (154). The processing unit (11) for acquiring information related to a chromosomal abnormality, and analyzing the image based on the information related to the acquired chromosome abnormality.

"Information related to chromosomal abnormality" includes information on structural changes due to deletion, inversion, translocation, duplication and the like of chromosomes, information on mutations such as increase and decrease in the number of chromosomes, and names of diseases caused by chromosomal abnormalities. As chromosome abnormality occurs, the bright spots in the image in the FISH examination, for example, change.

According to the image analysis apparatus according to this aspect, information on chromosome abnormality is acquired, and an image is analyzed based on the acquired information. Therefore, even when a chromosomal abnormality occurs, it is possible to properly analyze the image and to appropriately analyze whether the analysis target cell is an abnormal cell.

In the image analysis apparatus (10) according to this aspect, the processing unit (11) may be configured to analyze bright spots in the image based on a combination of bright spots corresponding to information on chromosome abnormality. The combination of bright spots is, for example, a combination of the color and the number of bright spots. The color of the bright spots is information differentiating a first bright spot and a second bright spot when the first bright spot based on the light of the first wavelength and the second bright spot based on the light of the second wavelength are present in the image, respectively. The combination of the color and the number of the bright spots is, for example, a combination of the number of the bright spots existing for each color of the bright spots, and is information indicating the number of first bright spots, the number of second bright spots, and the number of bright spots where the first bright spot and the second bright spot overlap when the first bright spot based on the light of the first wavelength and the second bright spot based on the second wavelength are present in the image. The bright spots in the image can be analyzed smoothly according to the combination of the color and the number of the bright spots.

In the image analysis apparatus (10) according to this aspect, the information on the chromosome abnormality is a past examination result. A past examination result is, for example, an examination result that specifying a predetermined abnormality in a chromosome. Depending on past examination results, bright spots in the image may change. Even in such a case, it is possible to appropriately analyze the bright spots based on the obtained past examination results.

In the image analysis apparatus (10) according to this aspect, the information related to the chromosomal abnormality is a disease name. Depending on the disease, bright spots in the image may change. Even in such a case, it is possible to appropriately analyze the bright spot based on the acquired disease name.

In the image analysis apparatus (10) according to this aspect, the information on the chromosome abnormality is information indicating whether transplantation that may cause a change in a chromosome has been performed, Transplantation that may cause a change in a chromosome is, for example, bone marrow transplant between opposite sexes. Even in such a case, it is possible to appropriately analyze the bright spots based on whether transplantation that may cause a change in a chromosome has been performed.

A second aspect of the present invention relates to an image analysis apparatus. An image analysis apparatus (10) according to this aspect includes a light source (121, 122) that irradiates light on a sample (21) having a labeled target site, an imaging unit (154) configured to capture light generated from the sample by irradiating light, and a processing unit (11) for processing the image captured by the imaging unit (154). The processing unit (11) acquires the subject information on the sample (21), and analyzes the image based on the acquired subject information.

"Subject information" refers to, for example, information relating to the subject's past examination results, the name of the disease acquired by the subject, whether the subject has received a transplant that may cause a change in a chromosome, and is information indicating the cause of a change of the bright spots in the image.

According to the image analysis apparatus according to this aspect, the subject information relating to the sample is acquired, and the image is analyzed based on the acquired subject information. Therefore, even when a chromosomal abnormality occurs, it is possible to properly analyze the image and to appropriately analyze whether the analysis target cell is an abnormal cell.

In the image analysis apparatus (10) according to this aspect, the processing unit (11) may be configured to analyze bright spots in an image based on a combination of bright spots corresponding to information on chromosome abnormality.

In this case, the combination of the bright spots may be a combination of the color and the number of the bright spots. The color of the bright spots is information differentiating a first bright spot and a second bright spot when the first bright spot based on the light of the first wavelength and the second bright spot based on the light of the second wavelength are present in the image, respectively. The color of the bright spot is not limited to the color of the light which is the source of the bright spot, and may be a color conveniently added to distinguish the kind of the bright spot. The combination of the color and the number of the bright spots is, for example, a combination of the number of the bright spots existing for each color of the bright spots, and is information indicating the number of first bright spots, the number of second bright spots, and the number of bright spots where the first bright spot and the second bright spot overlap when the first bright spot based on the light of the first wavelength and the second bright spot based on the second wavelength are present in the image. It is possible to smoothly analyze the bright spots in the image and to easily grasp what kind of bright spots are combined with each other according to the combination of the color and the number of the bright spots.

The image analysis apparatus (10) according to this aspect includes a storage unit (12) for storing a plurality of combinations of bright spots, and the processing unit (11) selects a combination of bright spots corresponding to the subject information, and analyzes the image based on the combination of the selected bright spots. In this way the image can be analyzed appropriately based on the read combination of the bright spots corresponding to the subject information. The operator also does not need to perform a complicated operation of selecting a combination of bright spots based on the subject information since analysis processing is automatically performed by the processing unit.

In this case, the storage unit (12) stores a combination of bright spots for each measurement item, and the processing unit (11) selects a combination of bright spots corresponding to the measurement item and subject information, and analyzes the image based on the combination of bright spots. In this way the image can be analyzed appropriately according to the measurement item since a combination of appropriate bright spots corresponding to the measurement items is used.

The image analysis apparatus (10) according to this aspect includes a display unit (13), and is configured such that the processing unit (11) displays subject information acceptance screens (310, 320, 330, 340, 350) on the display unit (13), and acquires the subject information via the subject information acceptance screen (310, 320, 330, 340, 350).

The image analysis apparatus (10) according to this aspect includes a communication unit (16) for communicating with an external computer (30) that stores subject information, and is configured such that the processing unit (11) acquires the subject information from the external computer (30) via the communication unit (16).

In the image analysis apparatus (10) according to this aspect, the subject information is a past examination result performed on the subject from whom the sample (21) was prepared. The past examination result is, for example, an examination result specifying a predetermined abnormality in a chromosome of the subject. Depending on past examination results, bright spots in the image may change. Even in such a case, it is possible to appropriately analyze the bright spots based on the obtained past examination results.

In the image analysis apparatus (10) according to this aspect, the subject information is the name of a disease affecting the subject from whom the sample (21) was prepared. Depending on the disease affecting the subject, the bright spots in the image may change. Even in such a case, it is possible to appropriately analyze the bright spot based on the acquired disease name.

In the image analysis apparatus (10) according to this aspect, the subject information is information indicating whether the subject from whom the sample (21) was prepared has undergone transplantation that may cause a change in a chromosome. Transplantation that may cause a change in a chromosome is, for example, bone marrow transplant between opposite sexes. Even in such a case, it is possible to properly analyze the bright spots based on whether the transplant has undergone a change to a chromosome.

In the image analysis apparatus (10) according to this aspect, the processing unit (11) analyzes the image based on the subject information for each of a plurality of cells included in the sample (21), and determines whether the cell is abnormal. In this way it can be properly determined whether the cells are abnormal since the analysis of the bright spots in the image is properly performed based on the subject information.

In this case, the processing unit (11) determines whether the combination of the bright spots in the image matches the combination of the abnormal or normal bright spots corresponding to the subject information. In this way it is possible to smoothly and appropriately determine whether a cell is abnormal.

The image analysis apparatus (10) according to this aspect includes a display unit (13), and is configured such that the processing unit (11) calculates the number or ratio of abnormal cells and displays the calculation result on the display unit (13). In this way the operator can use the abnormal/normal cell number or the abnormal/normal cell ratio referred to for diagnosis of the subject from whom the sample was prepared.

The image analysis apparatus (10) according to this aspect includes a display unit (13), and is configured such that the processing unit (11) analyzes images for each of a plurality of cells included in the sample (21), calculates the number or ratio of cells which do not match the combination of the bright spots that are abnormal/normal, displays a reanalysis acceptance screen (430, 450) for accepting an instruction for analyzing the image again on the display unit (13), and analyzes the image based on receiving an instruction for reanalysis.

When the bright spots are analyzed in this way, it can be quickly determined whether each cell is abnormal. The operator can determine the reliability of the analysis since the number or ratio of cells that cannot be analyzed is displayed on the display unit when analyzing the bright spots. If the operator determines that the reliability of the analysis is low, the operator can issue an instruction for analysis of the bright spot based on the subject information via the reanalysis acceptance screen displayed on the display unit. Analysis with high reliability can be performed by analyzing the bright spots again based on the subject information.

In this case, the processing unit (11) executes a process of acquiring the subject information based on acceptance of an instruction for reanalyzing the image via the reanalysis acceptance screen (430, 450).

The image analysis apparatus (10) according to this aspect includes a display unit (13), and the processing unit (11) is configured to analyze an image for each of a plurality of cells included in the sample (21), calculate the number or ratio of cells that do not match the combinations of bright spots when either abnormal or normal, and reanalyzes the image based on the subject information when the number or ratio of cells that do not match the combinations of the bright spots in case of abnormal or normal is larger than a predetermined value. In this way it is possible to quickly and appropriately analyze the bright spots in the image.

In the image analysis apparatus (10) according to this aspect, the processing unit (11) is configured to calculate a result of analyzing the image based on a combination of the bright spots applied irrespective of the subject information, and a result of analyzing the image based on the subject information, and switchably display the results on the display unit (13). In this way the operator can compare the two analysis results and obtain the more appropriate analysis result as the final result.

The image analysis apparatus (10) according to this aspect includes a display unit (13), and the processing unit (11) is configured to display an image captured by the imaging unit (154) on the display unit (13). In this way the operator can use the referenced image for the diagnosis of the subject from whom the sample was prepared.

In this case, the processing unit (11) may be configured to display an item (451) for inputting the subject information on the screen (450) on which the image is displayed. In this way the operator can input the subject information while referring to the image.

In the image analyzer (10) according to this aspect, a target site in the sample (21) can be labeled with a fluorescent stain. In this way a sharp image can be acquired.

In this case, the processing unit (11) may be configured to extract the bright spot of fluorescence generated from the fluorescent stain that marks the target site from the fluorescence image for each of the plurality of cells contained in the sample (21).

The image analyzer (10) according to this aspect includes a flow cell (110) through which a sample (21) flows, the light sources (121, 122) are configured to irradiate light onto the sample (21) flowing through the flow cell (110), and the imaging unit (154) is configured to image light originating from sample (21) flowing through flow cell (110). In this way an image based on an enormous number of cells can be smoothly generated. Even when the detection target cell is a rare cell, for example, this cell can be reliably imaged.

In the image analysis apparatus (10) according to this aspect, the target site may be a predetermined gene in the nucleic acid.

A third aspect of the present invention relates to an image analysis method. The image analyzing method according to this aspect includes a step (S14, S33) of irradiating light on a sample (21) having a labeled target site, a step (S14, S33) of acquiring an image by imaging the light generated from the sample (21) by irradiation with light, a step (S13, S37, S41) of acquiring information on chromosome abnormality, a step (S15, S38) of analyzing an image based on information related to chromosomal abnormality.

According to the image analyzing method of this aspect, the same effect as in the first aspect is obtained.

In the image analysis method according to this aspect, in the step of analyzing the image (S15, S38), the image is analyzed using a combination of bright spots corresponding to information on chromosome abnormality.

A fourth aspect of the present invention relates to an image analysis method. The image analyzing method according to this aspect includes a step (S14, S33) of irradiating light on a sample (21) having a labeled target site, a step (S14, S33) of acquiring an image by imaging the light generated from the sample (21) by irradiation with light, a step (S13, S37, S41) of acquiring subject information relating to the sample, and a step (S15, S38) of analyzing an image based on the acquired subject information.

According to the image analyzing method of this aspect, the same effect as that of the second aspect is obtained.

In the image analysis method according to this aspect, in the step of analyzing the image (S15, S38), the image is analyzed using a combination of bright spots corresponding to subject information.

A fifth aspect of the present invention relates to an image analysis apparatus. The image analysis apparatus (10) according to this aspect includes a light source (121, 122) that irradiates light on a sample (21) having a labeled target site, an imaging unit (154) configured to capture light generated from the sample by irradiating light, a processing unit (11) for processing the image captured by the imaging unit (154), and a display unit (13). The processing unit (11) acquires information on a chromosome abnormality and causes the display unit (13) to display the combination of the bright spots selected on the basis of the acquired information on the chromosome abnormality.

According to the image analysis apparatus of this aspect, the operator can grasp the combination of the bright spots to be used for analyzing the image by referring to the display unit.

A sixth aspect of the present invention relates to an image analysis apparatus. The image analysis apparatus (10) according to this aspect includes a light source (121, 122) that irradiates light on a sample (21) having a labeled target site, an imaging unit (154) configured to capture light generated from the sample by irradiating light, a processing unit (11) for processing the image captured by the imaging unit (154), and a display unit (13). The processing unit (11) acquires the subject information relating to the sample (21), and displays the combination of the bright spots selected based on the acquired subject information on the display unit (13).

According to the image analyzing method of this aspect, the same effect as that of the fifth aspect is obtained.

A seventh aspect of the present invention relates to an image analysis apparatus. The image analysis apparatus (10) according to this aspect includes a light source (121, 122) that irradiates light on a sample (21) having a labeled target site, an imaging unit (154) configured to capture light generated from the sample by irradiating light, a processing unit (11) for processing the image captured by the imaging unit (154), and a display unit (13). The processing unit (11) displays an acceptance screen (310, 320, 330, 340, 350) for accepting at least one information among past examination results, disease name, and whether transplantation causing a change in a chromosome occurred) on the display unit (13).

According to the image analysis apparatus of this aspect, the operator can smoothly input information indicating the cause of the change in the bright spots in the image via the reception screen.

According to the present invention, even if a chromosome abnormality occurs in a subject, whether the analysis target cell is an abnormal cell can be appropriately analyzed.

BRIEF DESCRIPTION OF THE DRAWINGS

FIGS. 3A and 3B are schematic diagrams showing combinations of the number of bright spots for each color in a typical case in measurement item BCR-ABL according to the first embodiment;

FIGS. 4A and 4B are schematic diagrams showing combinations of the number of bright spots for each color in the case of chromosome 9 long arm deficit in measurement item BCR-ABL according to the first embodiment;

FIGS. 4C and 4D are schematic diagrams showing combinations of the number of bright spots for each color in case of chromosome 22 long arm insertion anomaly in measurement item BCR-ABL according to the first embodiment;

FIGS. 5A and 5B are schematic diagrams showing combinations of the number of bright spots of each color in a typical case in the measurement item PML-RARα according to the first embodiment;

FIGS. 6A and 6B are schematic diagrams showing combinations of the number of bright spots of each color in the case of chromosome 17 long arm deficit in measurement item PML-RARα according to the first embodiment;

FIGS. 6C and 6D are schematic diagrams showing combinations of the number of bright spots of each color in the case of chromosome 17 long arm insertion anomaly in the measurement item PML-RARα according to the first embodiment;

FIGS. 7A and 7B are schematic diagrams showing combinations of the number of bright spots of each color in a typical case in measurement item TEL-AML 1 according to the first embodiment; FIGS. 7C and 7D are schematic diagrams showing combinations of the number of bright spots of each color in the case of chronic lymphocytic leukemia in the measurement item TEL-AML 1 according to the first embodiment;

FIGS. 8A and 8B are schematic diagrams showing combinations of the number of bright spots of each color in a typical case in measurement items AML1-ETO according to the first embodiment; FIGS. 8C and 8D are schematic diagrams showing combinations of the number of bright spots of each color in acute myelogenous leukemia in the measurement item AML1-ETO according to the first embodiment;

FIGS. 9A and 9B are schematic diagrams showing combinations of the number of bright spots of each color in a typical case in the measurement item chromosome according to the first embodiment; FIGS. 9C and 9D are schematic diagrams showing combinations of the number of bright spots of each color when bone marrow transplantation between opposite sexes is performed in the measurement item chromosome according to the first embodiment;

FIG. 22 is a diagram schematically showing a screen for displaying analysis results for each sample ID according to the third embodiment;

DETAILED DESCRIPTION OF THE PREFERRED EMBODIMENTS

In the following embodiments, the present invention is applied to an apparatus for measuring and analyzing a sample having a labeled target site. In the following embodiments, the fluorescence generated from the sample flowing through the flow cell is captured based on the FISH method. When imaging is performed based on the FISH method, the target site is labeled with a fluorescent stain and the fluorescence generated from the fluorescent stain that marks the target site is captured. Detection target cells are leukocytes in the blood. The target site is a predetermined gene in the nucleic acid of the detection target cell. Labeling of the target site is performed in a pretreatment step including a step of hybridizing a nucleic acid probe labeled with a fluorescent stain and a target site in the nucleic acid, and a sample is prepared by the pretreatment step.

Note that the specimen from which the sample is prepared by the pretreatment step is not limited to blood, and may be, for example, plasma or a specimen collected from the tissue. The cells to be detected are not limited to leukocytes in the blood, and also may be cells in a body fluid sample such as urine or bone marrow fluid, or cells isolated from tissues. The target site is not limited to a gene in nucleic acid, and also may be a site other than the gene region, for example, a protein. Labeling of the target site may be performed by immunostaining based on antigen-antibody reaction.

In the following embodiments, cells may be imaged based on the in situ hybridization method (ISH method). When imaging is performed based on the ISH method, the target site is not labeled with a fluorescent stain, and light generated from the target site is imaged.

In the following embodiments, bright spots also are extracted in the captured image. Here, the bright spot is a distribution area of light appearing on the captured image corresponding to the light generated based on the target site, irrespective of whether the image was captured based on the FISH method or the ISH method. The bright spot also is not necessarily limited to a point. That is, depending on the target site, the distribution region of light in the captured image may have an area small enough to correspond to a point, or may have an area larger than a point. Therefore, the bright spots indicate the distribution a region of light based on the target site regardless of the area of the light distribution region.

First Embodiment

Figure 1:
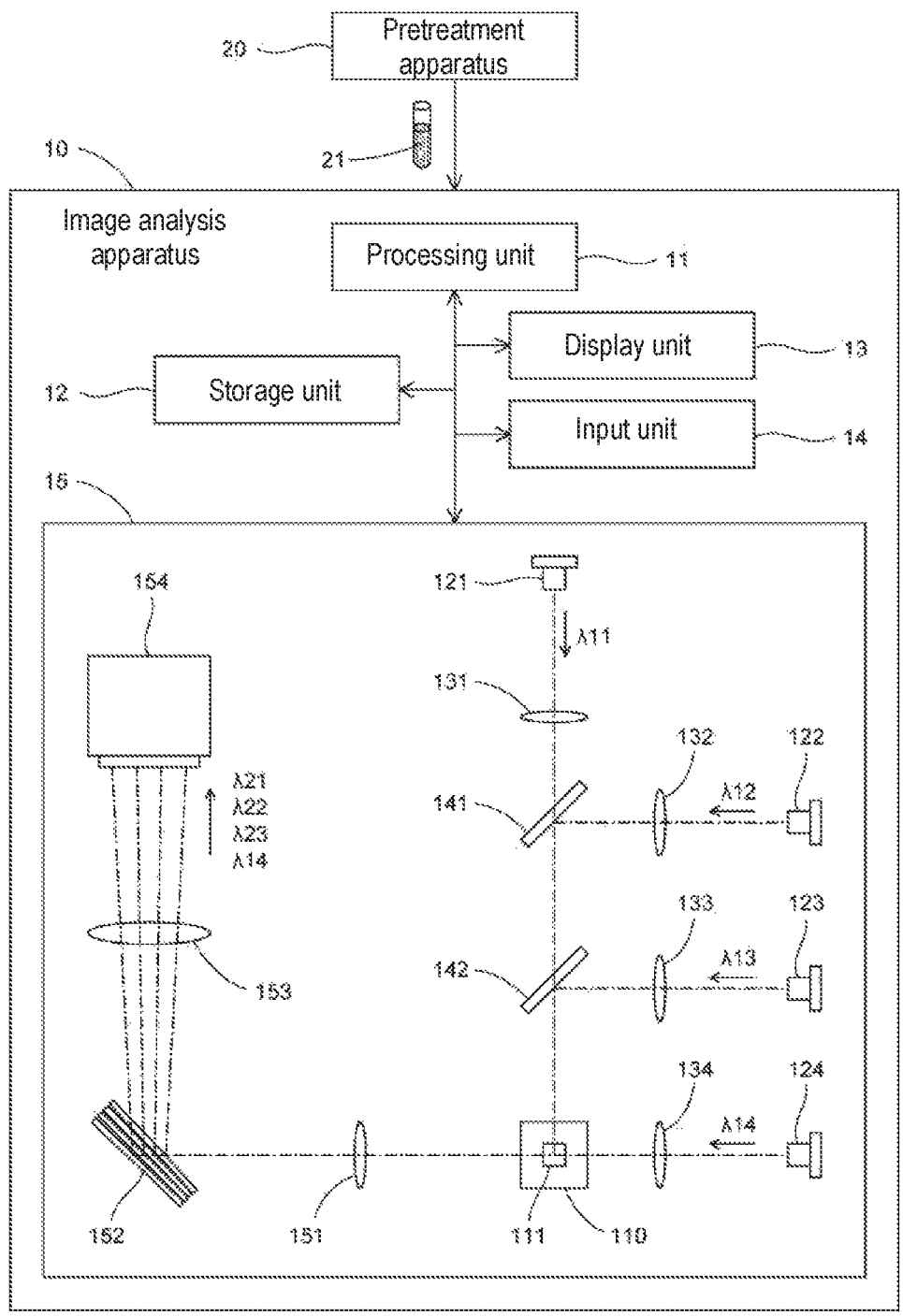
FIG. 1 is a diagram schematically showing a configuration of an image analysis apparatus according to a first embodiment.

As shown in FIG. 1, the image analysis apparatus 10 measures and analyzes a sample 21 prepared by a pretreatment process by a pretreatment apparatus 20. The operator performs processing such as centrifugation of the blood collected from the subject and extracts white blood cells that are detection target cells. The pretreatment device 20 includes a mixing container for mixing the reagent and the sample subjected to the treatment such as centrifugal separation, a dispensing unit for dispensing the sample and reagent to the mixing container, a heating device for heating the mixing container and the like. The pretreatment apparatus 20 carries out a pretreatment including a step of labeling a target site of a detection target cell collected from a subject with a fluorescent stain, and a step of specifically staining the nucleus of the cell with a stain for nuclear staining to prepare a sample 21.

In the step of labeling the target site, the pretreatment device 20 hybridizes a nucleic acid probe labeled with a fluorescent stain and two different genes in the nucleic acid. In this way two different genes in the detection target cell are labeled with different fluorescent stains. The two genes that are labeled as target sites in the labeling step are hereinafter referred to as "first gene" and "second gene".

The first gene is fluorescently labeled via a nucleic acid probe to which a fluorescent stain which produces fluorescence of wavelength $\lambda 21$ is bound by irradiation with excitation light of wavelength $\lambda 11$. The second gene is fluorescently labeled via a nucleic acid probe to which a fluorescent stain which produces fluorescence of wavelength $\lambda 22$ is bound by irradiation with excitation light of wavelength $\lambda 12$. The nucleus is stained with a stain for nuclear staining which produces fluorescence of wavelength $\lambda 23$ by irradiation with excitation light of wavelength $\lambda 13$.

The image analysis apparatus 10 includes a processing unit 11, a storage unit 12, a display unit 13, an input unit 14, and a measurement unit 15.

The processing unit 11 is configured by a CPU. The processing unit 11 also may be configured by a microcomputer. The processing unit 11 performs various processes based on a program stored in the storage unit 12. The processing unit 11 is connected to each unit in the image analysis apparatus 10, receives signals from each unit, and controls each unit. The storage unit 12 is configured with a RAM, a ROM, a hard disk, and the like. The display unit 13 is configured by a display. The input unit 14 includes a mouse and a keyboard. The display unit 13 and the input unit 14 may be integratedly configured by a touch panel type display.

The measurement unit 15 includes a flow cell 110, light sources 121 to 124, condenser lenses 131 to 134, dichroic mirrors 141 and 142, a condenser lens 151, an optical unit 152, a condenser lens 153, an imaging unit 154. The sample 21 prepared in the pretreatment device 20 flows through a flow channel 111 of the flow cell 110.

The light sources 121 to 124 irradiate light on the sample 21 flowing through the flow cell 110. The light sources 121 to 124 are configured by semiconductor laser light sources. The light beams emitted from the light sources 121 to 124 are laser beams having wavelengths 211 to 214, respectively. The condenser lenses 131 to 134 collect the light emitted from the light sources 121 to 124, respectively. The dichroic mirror 141 transmits light of wavelength $\lambda 11$ and reflects light of wavelength $\lambda 12$. The dichroic mirror 142 transmits light of wavelengths $\lambda 11$ and $\lambda 12$, and reflects light of wavelength $\lambda 13$. In this way the sample 21 flowing through the flow channel 111 of the flow cell 110 is irradiated with the light having the wavelengths $\lambda 11$ to $\lambda 14$.

Fluorescence is given off from the sample 21 when the sample 21 flowing through the flow cell 110 is irradiated with light having wavelengths $\lambda 11$ to $\lambda 13$. Specifically, when the fluorescent stain that labels the first gene is irradiated with light of the wavelength $\lambda 11$, a fluorescence of the wavelength $\lambda 21$ is given off from this fluorescent stain. When the light with the wavelength $\lambda 12$ is irradiated to the fluorescent stain that marks the second gene, fluorescence with the wavelength $\lambda 22$ is given off from this fluorescent stain. When light having a wavelength $\lambda 13$ irradiates the stain for nuclear staining which stains nuclei, fluorescence having a wavelength $\lambda 23$ is given off from the stain for nuclear staining. When the sample 21 flowing through the flow cell 110 is irradiated with light having a wavelength $\lambda 14$, this light is transmitted through the cell. The light having the wavelength $\lambda 14$ transmitted through the cell is used for generating a bright field image. In the first embodiment, the wavelength $\lambda 21$ is a wavelength band of green light, the wavelength $\lambda 22$ is a wavelength band of red light, and the wavelength $\lambda 23$ is a wavelength band of blue light.

The condenser lens 151 collects the fluorescence of the wavelengths $\lambda 21$ to $\lambda 23$ generated from the sample 21 flowing through the channel 111 and the light of the wavelength $\lambda 14$ transmitted through the sample 21 flowing through the channel 111. The optical unit 152 has a configuration in which four dichroic mirrors are combined. The four dichroic mirrors of the optical unit 152 reflect the fluorescence of the wavelengths $\lambda 21$ to $\lambda 23$ and the light of the wavelength $\lambda 14$ at slightly different angles from each other, and separate them on the light receiving surface of the imaging unit 154. The condenser lens 153 collects the fluorescence of the wavelengths $\lambda 21$ to $\lambda 23$ and the light of the wavelength $\lambda 14$.

The imaging unit 154 is configured by a TDI (Time Delay Integration) camera. The imaging unit 154 captures the fluorescence of the wavelengths λ21 to λ23 and the light of the wavelength λ14, and generates a fluorescence image corresponding to the fluorescence of the wavelengths λ21 to λ23 and the bright field image corresponding to the light of the wavelength λ14. In the first embodiment, each image generated by the imaging unit 154 is a grayscale image, but may be a color image. The processing unit 11 causes the storage unit 12 to store the fluorescence images and the bright-field image generated by the imaging unit 154.

Here, since the imaging unit 154 is configured by a TDI camera, the fluorescence received on the light receiving surface of the imaging unit 154 is accumulated to generate a fluorescence image and a bright field image. In this way it is possible to improve the quality of the fluorescence image and the bright field image of the cell.

The processing unit 11 processes the fluorescence image stored in the storage unit 12. Specifically, the processing unit 11 extracts a bright spot from a fluorescence image corresponding to the fluorescence of the wavelength λ21, that is, a fluorescent image of the first gene. The processing unit 11 extracts a bright spot from the fluorescence image corresponding to the fluorescence of the wavelength λ22, that is, the fluorescence image of the second gene. The processing unit 11 extracts a nuclear region from a fluorescence image corresponding to the fluorescence of the wavelength λ23, that is, a nuclear fluorescence image. Extraction of bright spots in fluorescent images of genes and extraction of nuclear regions in fluorescent images of nuclei will be described later with reference to FIGS. 2A and 2B.

The processing unit 11 also acquires subject information on the sample 21 from the operator via the input unit 14, and analyzes the bright spots in the fluorescence image based on the acquired subject information. The subject information is information on the subject from whom the sample 21 was prepared. Then, based on the analysis result of the bright spots, the processing unit 11 determines whether each cell is an abnormal cell to detect abnormal cells.

Note that the concept of the determination of whether a cell is an abnormal cell is not limited to the determination of whether the cell is normal or abnormal but also includes a determination of whether the cell is positive or negative. In the following description, positive cells correspond to abnormal cells and negative cells to normal cells.

Here, the bright spot in the fluorescence image changes not only depending on whether the cell is an abnormal cell but also varies depending on a subject's genetic mutation, disease, sex and the like. In the first embodiment, in order to cope with such a change in the bright spots, the subject information is acquired as described above. The subject information in this case is information indicating a cause for changes in the bright spots of the fluorescence image, and includes, for example, information on past test results of the subject, the name of the disease affecting the subject, whether the subject received a transplant that causes a change in a chromosome and the like. According to the first embodiment, since the bright spots are analyzed based on the subject information, the bright spots in the fluorescence image can be analyzed appropriately even when the bright spots in the fluorescence image change. Whether the cells are abnormal can be properly determined since the analysis of the bright spots in the composite image is properly performed based on the subject information.

The sample 21 flows through the flow cell 110, and the fluorescence generated from the sample 21 flowing through the flow cell 110 is imaged. In this way an image based on an enormous number of cells can be smoothly generated. Even when the detection target cell is a rare cell, this cell can be reliably imaged.

Next, with reference to FIGS. 2A and 2B, extraction of nuclear regions and extraction of bright spots of genes performed by the image analysis apparatus 10 will be described. The images shown at the left end of FIGS. 2A and 2B show fluorescence images acquired from the same portion of the sample 21 flowing through the flow cell 110.

Figure 2A:
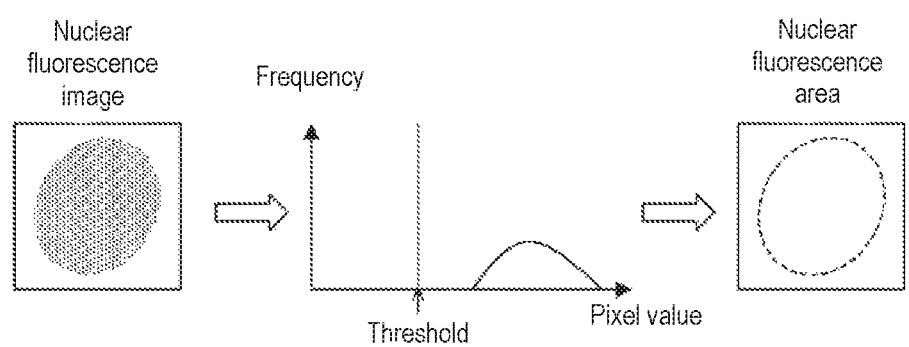
FIG. 2A is a diagram illustrating the extraction of a nucleus region performed by the image analysis apparatus according to first embodiment.

When a nuclear fluorescence image is obtained as shown at the left end of FIG. 2A, the processing unit 11 calculates the fluorescence image of the nucleus as shown in the center of FIG. 2A To create a graph of luminance and frequency. The number of the vertical axis indicates the number of pixels. The processing unit 11 sets a luminance threshold value in this graph. Then, the processing unit 11 extracts a range in which pixels having luminance larger than the threshold value are distributed as a core area as indicated by a broken line at the right end of FIG. 2A. Note that in the nuclear fluorescence image, when two nuclei are overlapped, a fluorescence image based on overlapping cells is not used for the determination of abnormal cells and the image is excluded.

Figure 2B:
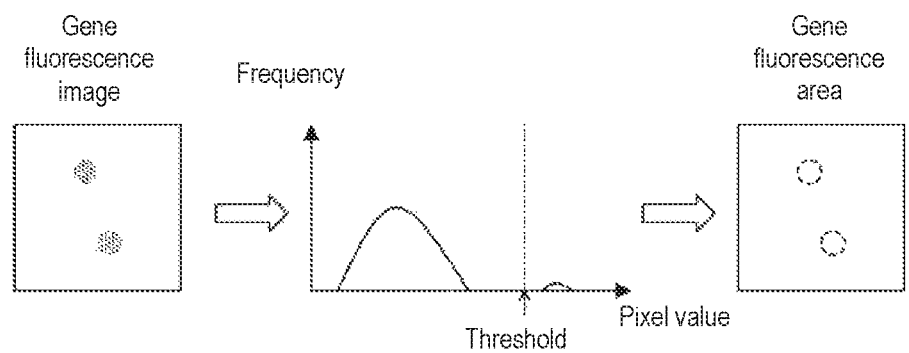
FIG. 2B is a diagram illustrating the extraction of bright spots of genes performed by the image analysis apparatus according to the first embodiment.

When the fluorescence image of the gene is obtained as shown at the left end of FIG. 2B, the processing unit 11 a graph of the luminance and frequency as shown in the center of FIG. 2B based on the luminance at each pixel on the fluorescent image of the gene. In this graph, the processing unit 11 sets a luminance threshold as a boundary between the bright spot and the background based on the Otsu method, for example. Then, the processing unit 11 extracts a range in which pixels having luminance greater than the threshold value are distributed as a bright spot as indicated by a broken line at the right end of FIG. 2B. Note that when extracting a bright spot from a fluorescent image of a gene, a bright spot having an extremely small area, a bright spot having an extremely large area, and a nucleus area shown at the right end of FIG. 2A that are not included are excluded.

Also note that the processing unit 11 may extract the nuclear region from the nuclear fluorescence image by calculation according to the above procedure without creating a graph as shown in the center of FIGS. 2A and 2B to extract bright points from fluorescent images of the genes. The extraction of bright spots is performed by determining the degree of matching between the distribution waveform of the normal bright spot and the region to be determined, and extracts the region to be determined as a bright spot when the degree of matching is high. Although the processing unit 11 detects cells by extracting nuclear regions from nuclear fluorescence images, cells also may be detected based on bright field images. In the case where cells are detected based on the bright field image, the acquisition of the nuclear fluorescence image can be omitted. The bright spot in the embodiment is a bright spot of fluorescence obtained from a fluorescent stain of a nucleic acid probe bound to a gene as a target site in the nucleus.

Next, determination of abnormal cells performed by the image analysis apparatus 10 will be described.

Measurement items such as BCR-ABL, PML-RARα, TEL-AML1, AML1-ETO, and sex chromosome are set in advance in the sample 21 supplied to the image analysis apparatus 10. Although only the measurement items described above will be described below, the measurement items set for the sample 21 are not limited to the above measurement items.

When the measurement item is BCR-ABL, the first gene is regarded as a BCR gene on chromosome 22, and the second gene is set as the ABL gene on chromosome 9. When the measurement item is PML RARα, the first gene is regarded as the RARα gene on chromosome 17, and the second gene is set as the PML gene on chromosome 15. When the measurement item is TEL-AML1, the first gene is regarded as a TEL gene on chromosome 12, and the second gene is regarded as the AML gene on chromosome 21. When the measurement item is AML1-ETO, the first gene is regarded as the ETO gene on chromosome 8, and the second gene is regarded as the AML gene on chromosome 21. When the measurement item is a sex chromosome, the first gene is regarded as the X chromosome and the second gene is regarded as the Y chromosome. The pretreatment apparatus 20 prepares the sample 21 so as to label the first gene and the second gene according to the measurement item.

As described above, the processing unit 11 measures the sample 21 prepared in the pretreatment apparatus 20 with the measuring unit 15 and obtains a grayscale fluorescence image based on the first gene, a grayscale fluorescence image based on the second gene, and a nuclear-based gray scale fluorescence image. The processing unit 11 extracts the bright spot of the gene and extracts the nuclear region with respect to the grayscale fluorescence image as described above.

Subsequently, the processing unit 11 corrects the color tone for the grayscale fluorescence image. Specifically, the processing unit 11 corrects the color tone of the fluorescence image of the first gene so that the bright spot of the first gene becomes green. The processing unit 11 corrects the color tone so that the bright spot of the second gene becomes red relative to the fluorescence image of the second gene. The processing unit 11 corrects the color tone of the nuclear fluorescence image so that the nucleus area becomes blue. Then, the processing unit 11 combines the fluorescence image of the first gene whose color tone has been corrected and the fluorescence image of the second gene whose color tone is corrected, and stores the synthesized fluorescence image in the storage unit 12. Hereinafter, the fluorescence image obtained by combining the fluorescence image of the first gene and the fluorescence image of the second gene is referred to as "composite image".

Note that although the color tone of each fluorescence image is corrected in the same manner as the color of fluorescence actually generated based on the first gene, the second gene, and the nucleus, the present invention is not limited to this inasmuch as the color tones may be corrected so as to have a color different from the actually generated fluorescent color.

The processing unit 11 analyzes the cell based on a combination of the number of green bright spots, the number of red bright spots, and the number of yellow bright spots in the composite image generated for one cell. The yellow bright spot is the bright spot appearing in the composite image when the green bright spot in the fluorescence image of the first gene overlaps the red bright spot in the fluorescence image of the second gene. For example, when the distance between the center of the green bright spot in the fluorescence image of the first gene and the center of the red bright point in the fluorescence image of the second gene is equal to or less than a predetermined value, it is determined that a yellow bright spot is generated in the composite image. The processing unit 11 compares the combination of the bright spots in the generated composite image with the combination of the bright spots stored in advance in the storage unit 12 to determine whether the cell is an abnormal cell.

Note that the combination of bright spots is, for example, a combination of the color and the number of the bright spots, and more specifically, the combination of the number of bright spots existing for each color of the bright spots, that is, the combined number of bright spots of each color. The combination of numbers for each color of the bright spots is also a reference pattern for determining whether the cells are abnormal.

When the measurement item is BCR-ABL, the processing unit 11 determines whether a BCR-ABL fusion gene is generated by translocation in the cell. When the measurement item is PML-RARα, the processing unit 11 determines whether a PML-RARα fusion gene is generated by translocation in the cell. When the measurement item is TEL-AML1, the processing unit 11 determines whether a TEL-AML1 fusion gene is generated by translocation in the cell. When the measurement item is AML1-ETO, the processing unit 11 determines whether a AML1-ETO fusion gene is generated by translocation in the cell. When the measurement item is a sex chromosome, the processing unit 11 determines the condition of the sex chromosome in the cell. Note that the abnormality of the gene determined by the measurement item is not limited to the translocation, and may be gene amplification, deletion, inversion, duplication and the like.

In this way the bright spots in the composite image can be analyzed smoothly according to the combination of the numbers of the bright points of the generated composite image for each color. It also is possible to easily grasp what kinds of bright spots are combined and how they are combined according to the combination of the number of the bright spots for each color.

Note that, in the analysis of the bright spots, the fluorescence image of the first gene and the fluorescence image of the second gene alone also may be used. In this case, whether the bright spot of the fluorescence image of the first gene and the bright spot of the second gene are superimposed on each other is determined based on the coordinates of the bright spot in the fluorescence image of the first gene and the coordinates of the bright spot in the fluorescence image of the second gene, and a combination of the number of the bright spots is obtained for each color of the bright spots.

Combinations of the numbers for each color of bright spots will be described with reference to FIGS. 3A to 9D. In FIGS. 3A to 9D, for the sake of convenience, in the fluorescence image and composite image of the gene, the green bright spots are indicated by black circles, the red bright spots are indicated by White circles, the yellow bright spots are represented by two concentric circles.

As shown in FIG. 3A, when the measurement item is BCR-ABL and the cell is negative, usually two green bright spots appear in the fluorescence image of the BCR gene, and two red bright spots appear in the fluorescence image of the ABL gene. Then, two green bright spots and two red bright spots appear in the composite image. On the other hand, as shown in FIG. 3B), when the cells are positive, three green bright spots usually appear in the fluorescence image of the BCR gene, and three red bright spots appear in the fluorescence image of the ABL gene. Then, one green bright spot, one red bright spot, and two yellow bright spots appear in the composite image. That is, in this case, the two green bright spots on the fluorescence image of the BCR gene overlap with the two red bright spots on the fluorescence image of the ABL gene, and two yellow bright spots appear in the composite image.

Here, when the number of green bright spots is n1, the number of red bright spots is n2, and the number of yellow bright spots is n3 in the composite image, the number of bright spots per color in the composite image is referred to as "Gn1Rn2Yn3". The number n1, n2, n3 of bright spots in the composite image is the number of bright spots visible on the composite image. That is, when a yellow bright spot is generated in the composite image, the number n1 of green bright spots in the composite image is smaller than the number of green bright spots in the fluorescence image of the first gene, and number n2 of red bright spots is smaller than the number of red bright spots in the fluorescence image of the second gene.

According to the above rule, as shown in FIGS. 3A and 3B, when the measurement item is BCR-ABL and the cell is normally negative, the combination of the number of each bright spots in the composite image becomes "G2R2Y0", and when the cell is positive, the combination of the numbers of the bright spots in the composite image is "B1R1Y2".

Note that the rule indicating the combination of the number of the bright spots for each color is not limited to the above, inasmuch as, for example, the number n1 of the green bright spots in the composite image may be the number of green bright spots in the fluorescence image of the first gene, and the number n2 of red bright spots may be the number of red bright spots in the fluorescence image of the second gene. According to this rule, the combination of the number of bright spots for each color in the composite image shown in FIG. 3B is "G3R3Y2".

Based on the synthesized image generated from the cells, the processing unit 11 obtains the combination of the numbers of each color bright spot indicating the number of green bright spots, the number of red bright spots, and the number of yellow bright spots for each color of the bright spots. Then, the processing unit 11 determines whether the combination of the numbers of the bright spots acquired from the cells for each color matches either "G2R2Y0" or "G1R1Y2". Combinations of the numbers of the bright points such as "G2R2Y0" and "G1R1Y2" used for the determination are stored in the storage unit 12 in advance. The processing unit 11 determines that a cell is negative for the measurement item BCR-ABL when the combination of the numbers of the bright spots acquired from the cells for each color is "G2R2Y0". On the other hand, when the combination of the numbers of the bright spots acquired from the cells for each color is "G1R1Y2", the processing unit 11 determines that this cell is positive for the measurement item BCR-ABL.

Here, the reason the combination of the numbers of the bright spots for each color is the normal state shown in FIGS. 3A and 3B is that in the subject from whom the sample 21 was prepared, there are no other chromosomal abnormalities that would affect the determination result of the measurement item BCR-ABL. When there is another chromosome abnormality that affects the determination result of the measurement item BCR-ABL, the combination of the number of bright spots for each color in the composite image generated from the cells differs from that shown in FIGS. 3A and 3B.

For example, one long arm of chromosome 9 of a subject may be missing. In this case, if the cells are negative for the measurement item BCR-ABL, the combination of the numbers for each color of the bright spots is "G2R1Y0" as shown in FIG. 4A, and if the cells are positive for the measurement item BCR-ABL, the combination becomes "G2R1Y1" as shown in FIG. 4B. For example, there also may be a case where one long arm is inserted abnormally in chromosome 22 of the subject. In this case, when the cells are negative for the measurement item BCR-ABL, the combination of the numbers for each color of the bright spots is "G3R2Y0" as shown in FIG. 4C, and when the cells are positive for the measurement item BCR-ABL, the combination becomes "G2R1Y2" as shown in FIG. 4D.

In this way when there is another chromosome abnormality that affects the determination result of the measurement item BCR-ABL, the combination of the numbers of the bright points changes as shown in FIGS. 4A to 4D. Therefore, in the first embodiment, the processing unit 11 acquires that there is another chromosome abnormality as subject information. Then, the processing unit 11 selects a combination of the numbers of the bright spots for each color to be used for the determination based on the acquired subject information, and compares the combination of the number of the bright spots of each color acquired from the cells and the combination of the of bright spots of each color selected based on the subject information to determine whether the cells are positive or negative.

That is, when the measurement item is BCR-ABL and the processing unit 11 acquires "chromosome 9 long arm loss" as the subject information, the cell is determined to be negative when the combination of the numbers of the bright spots acquired from the cells for each color matches "G2R1Y0" shown in FIG. 4A, and the cell is determined to be positive when the combination of the numbers of the bright spots acquired from the cells for each color matches "G2R1Y1" shown in FIG. 4B. When the measurement item is BCR-ABL and the processing unit 11 acquires "chromosome 9 long arm insertion anomaly" as the subject information, the cell is determined to be negative when the combination of the numbers of the bright spots acquired from the cells for each color matches "G3R2Y0" shown in FIG. 4C, and the cell is determined to be positive when the combination of the numbers of the bright spots acquired from the cells for each color matches "G2R1Y2" shown in FIG. 4D.

Note that when the measurement item is BCR-ABL and the processing unit 11 obtains "not applicable" as the subject information, the cell is determined to be negative when the combination of the numbers of the bright spots acquired from the cells for each color matches "G2R2Y0" shown in FIG. 3A, and the cell is determined to be positive when the combination of the numbers of the bright spots acquired from the cells for each color matches "G1R1Y2" shown in FIG. 3B.

As shown in FIGS. 5A and 5B, when the measurement item is PML-RARα and the cells are usually negative, the combination of the numbers of the bright points in the composite image is "G2R2Y0", whereas the combination of the number of bright spots for each color in the composite image is "G1R1Y2" when the cells are positive. In this case, the processing unit 11 determines whether the combination of the numbers of the bright spots obtained from the cells for each color matches any one of FIGS. 5A and 5B, and whether the cells are positive or negative.

Here, the reason the combination of the numbers of the bright spots for each color is the normal state shown in FIGS. 5A and 5B is that in the subject from whom the sample 21 was prepared, there are no other chromosomal abnormalities that would affect the determination result of the measurement item PML-RARα. When there is another chromosome abnormality that affects the determination result of the measurement item PML-RARα, the combination of the number of bright points of each color in the composite image generated from the cells differs from that shown in FIGS. 5A and 5B.

For example, one long arm of chromosome 17 of a subject may be missing. In this case, when the cells are negative for the measurement item PML-RARα, the combination of the number of bright spots is "G1R2Y0" as shown in FIG. 6A, whereas when the cell is positive for the measurement item PML-RARα, the combination is "G1R2Y1" as shown in FIG. 6B. For example, there also may be a case where one long arm is inserted abnormally in chromosome 17 of the subject. In this case, when the cells are negative for the measurement item PML-RARα, the combination of the numbers for each color of the bright spots is "G3R2Y0" as shown in FIG. 6C, whereas when the cell is positive for the measurement item PML-RARα, the combination is "G2R1Y2" as shown in FIG. 6D.

When the measurement item is PML-RARα and the processing unit 11 acquires "chromosome 17 long arm loss" as the subject information, the processing unit 11 determines that the cells are negative when the combination of the numbers of the bright spots of each color acquired from the cells matches "G1R2Y0" shown in FIG. 6A, and determines that this cell is positive when the combination of numbers of bright spots of each color acquired from the cells matches "G1R2Y1." shown in FIG. 6B. When the measurement item is BCR-ABL and the processing unit 11 acquires "chromosome 17 long arm insertion anomaly" as the subject information, the cell is determined to be negative when the combination of the numbers of the bright spots of each color acquired from the cells matches "G3R2Y0" shown in FIG. 6C, and the cell is determined to be positive when the combination of the numbers of the bright spots of each color acquired from the cells matches "G2R1Y2" shown in FIG. 6D.

Note that when the measurement item is PML-RARα and the processing unit 11 obtains "not applicable" as the subject information, the cell is determined to be negative when the combination of the numbers of the bright points of each color acquired from the cell matches "G2R2Y0" is shown in FIG. 5A, and the cell is determined to be positive when the combination of the numbers of the bright spots of each color obtained from the cell matches "G1R1Y2" shown in FIG. 5B.

As shown in FIGS. 7A and 7B, when the measurement item is TEL AML1 and the cells are usually negative, the combination of the numbers of the bright spots of each color in the composite image is "G2R2Y0", whereas the combination of the number of bright spots for each color in the composite image is "G1R1Y2" when the cells are positive. In this case, the processing unit 11 determines whether the combination of the numbers of the bright spots of each color obtained from the cells matches any one of FIGS. 7A and 7B, and whether the cells are positive or negative.

Here, the reason the combination of the numbers of the bright spots for each color is the normal state shown in FIGS. 7A and 7B is that in the subject from whom the sample 21 was prepared, there are no other chromosomal abnormalities that would affect the determination result of the measurement item TEL-AML1. When there is another chromosome abnormality that affects the determination result of the measurement item TEL-AML1, the combination of the number of bright points of each color in the composite image generated from the cells differs from that shown FIGS. 5A and 5B.

For example, the subject may be suffering from chronic lymphocytic leukemia (CLL). In this case, when the cells are negative for the measurement item TEL-AML1, the combination of the numbers for the bright spots of each color is "G3R2Y0" as shown in FIG. 7C, whereas when the cell is positive for the measurement item TEL-AML1, the combination is "G2R1Y2" as shown in FIG. 7D.

When the measurement item is TEL-AML1 and the processing unit 11 acquires "chronic lymphocytic leukemia" as the subject information, the cell is determined to be negative when the combination of the numbers of the bright spots of each color acquired from the cells matches "G3R2Y0" shown in FIG. 7C, and the cell is determined to be positive when the combination of the numbers of the bright spots of each color acquired from the cells matches "G2R1Y2" shown in FIG. 7D.

Note that when the measurement item is TEL-AML1 and the processing unit 11 obtains "not applicable" as the subject information, the cell is determined to be negative when the combination of the numbers of the bright points of each color acquired from the cell matches "G2R2Y0" shown in FIG. 7A, and the cell is determined to be positive when the combination of the numbers of the bright spots of each color obtained from the cell matches "G1R1Y2" shown in FIG. 7B.

As shown in FIGS. 8A and 8B, when the measurement item is AML1-ETO and the cells are usually negative, the combination of the numbers of the bright spots of each color in the composite image is "G2R2Y0", whereas the combination of the number of bright spots for each color in the composite image is "G1R1Y2" when the cells are positive. In this case, the processing unit 11 determines whether the combination of the numbers of the bright spots of each color obtained from the cells matches any one of FIGS. 8A and 8B, and whether the cells are positive or negative.

Here, the reason the combination of the numbers of the bright spots for each color is the normal state shown in FIGS. 8A and 8B is that in the subject from whom the sample 21 was prepared, there are no other chromosomal abnormalities that would affect the determination result of the measurement item AML1-ETO. When there is another chromosome abnormality that affects the determination result of the measurement item AML1-ETO, the combination of the number of bright points of each color in the composite image generated from the cells differs from that shown FIGS. 8A and 8B.

For example, the subject may be suffering from acute myelogenous leukemia. (AML). In this case, when the cells are negative for the measurement item AML1-ETO, the combination of the numbers for the bright spots of each color is "G3R2Y0" as shown in FIG. 8C, whereas when the cell is positive for the measurement item AML1-ETO, the combination is "G2R1Y2" as shown in FIG. 8D.

When the measurement item is AML1-ETO and the processing unit 11 acquires "acute myelogenous leukemia" as the subject information, the cell is determined to be negative when the combination of the numbers of the bright spots of each color acquired from the cells matches "G3R2Y0" shown in FIG. 8C, and the cell is determined to be positive when the combination of the numbers of the bright spots of each color acquired from the cells matches "G2R1Y2" shown in FIG. 8D.

Note that when the measurement item is AML1-ETO and the processing unit 11 obtains "not applicable" as the subject information, the cell is determined to be negative when the combination of the numbers of the bright points of each color acquired from the cell matches "G2R2Y0" shown in FIG. 8A, and the cell is determined to be positive when the combination of the numbers of the bright spots of each color obtained from the cell matches "G1R1Y2" shown in FIG. 8B.

As shown in FIGS. 9A and 9B, when the measurement item is a sex chromosome and the subject is usually a male, the combination of the number of bright spots of each color in the composite image is "G1R1", and if the subject is a female, the combination of the numbers of the bright points of the composite image for each color is "G2R0". In this case, the processing unit 11 determines whether the combination of the numbers of the bright spots of each color obtained from the cells matches any one of FIGS. 9A and 9B, and whether the cells are normal or abnormal.

Here, the reason that the combination of the numbers of the bright spots for each color is the normal state shown in FIGS. 9A and 9B) is that a bone marrow transplant between opposite sexes has not been performed in the subject from whom the sample 21 was acquired. When a bone marrow transplant between opposite sexes has been performed, the combination of the numbers of the bright spots of each color in the composite image generated from the cells differs from those in FIGS. 9A and 9B.

For example, when a bone marrow transplant between opposite sexes is performed in a male subject, the combination of the number of bright spots of each color is "G2R0" as shown in FIG. 9C. For example, when a bone marrow transplant between opposite sexes is performed in a female subject, the combination of the number of bright spots of each color is "G1R1" as shown in FIG. 9D.

When the measurement item is a sex chromosome and the processing unit 11 acquires "male" and "bone marrow transplant between opposite sexes" as the subject information, the processing unit 11 determines that the cells are normal when the combination of the numbers of the bright spots of each color acquired from the cells matches "G2R0" shown in FIG. 9C, and determines that this cell is abnormal when the combination of the numbers of the bright spots of each color acquired from the cells matches "G1R1" shown in FIG. 9A. When the measurement item is a sex chromosome and the processing unit 11 acquires "female" and "bone marrow transplant between opposite sexes" as the subject information, the processing unit 11 determines that the cells are normal when the combination of the numbers of the bright spots of each color acquired from the cells matches "G1R1" shown in FIG. 9D, and determines that this cell is abnormal when the combination of the numbers of the bright spots of each color acquired from the cells matches "G2R0" shown in FIG. 9B.

Note that when the measurement item is a sex chromosome and the processing unit 11 acquires "male" and "bone marrow transplant between opposite sexes" as the subject information, the processing unit 11 determines that the cells are normal when the combination of the numbers of the bright spots of each color acquired from the cells matches "G1R1" shown in FIG. 9A, and determines that this cell is abnormal when the combination of the numbers of the bright spots of each color acquired from the cells matches "G2R0" shown in FIG. 9C. When the measurement item is a sex chromosome and the processing unit 11 acquires "female" and "bone marrow transplant between opposite sexes" as the subject information, the processing unit 11 determines that the cells are normal when the combination of the numbers of the bright spots of each color acquired from the cell matches "G2R0" shown in FIG. 9B, and determines that this cell is abnormal when the combination of the numbers of the bright spots of each color acquired from the cells matches "G1R1" shown in FIG. 9D.

Determining whether the cell is normal or abnormal when the measurement item is a sex chromosome is not limited to the above procedure. For example, the processing unit 11 also may determine that a cell is abnormal when the combination of the numbers of the bright spots of each color acquired from the cell does not match the combination of the numbers of the bright spots that are deemed normal.

As described above, the processing unit 11 determines whether a cell is abnormal relative to the measurement item based on whether the combination of the number of the bright spots of each color acquired from the cell matches the combination of the number of bright spots of each color corresponding to the subject information of the abnormal and normal case. In this way it is possible to smoothly and appropriately determine whether the cells are abnormal.

Note that the combination used in cell abnormality determination is not limited to the combination of numbers for each color of bright spots as described above, and may be any combination of numbers for each type of bright spot. The type of the bright spot is information for distinguishing between the bright spot based on the first gene and the bright point based on the second gene. For example, the bright spot in the fluorescence image of the first gene may be discriminated as number 1, the bright spot in the fluorescence image of the second gene may be discriminated as number 2, and the bright spot at the position where the bright spot of number 1 and the bright point of number 2 overlap may be discriminated as number 3. In this case, information indicating how many bright spots of each number are present is a combination of numbers for each type of bright spot.

Next, the processing of the image analysis apparatus 10 will be described with reference to the flowchart of FIG. 10. In this description, the screens shown in FIG. 11A to FIG. 16 are referred to as suitable.

Figure 10:
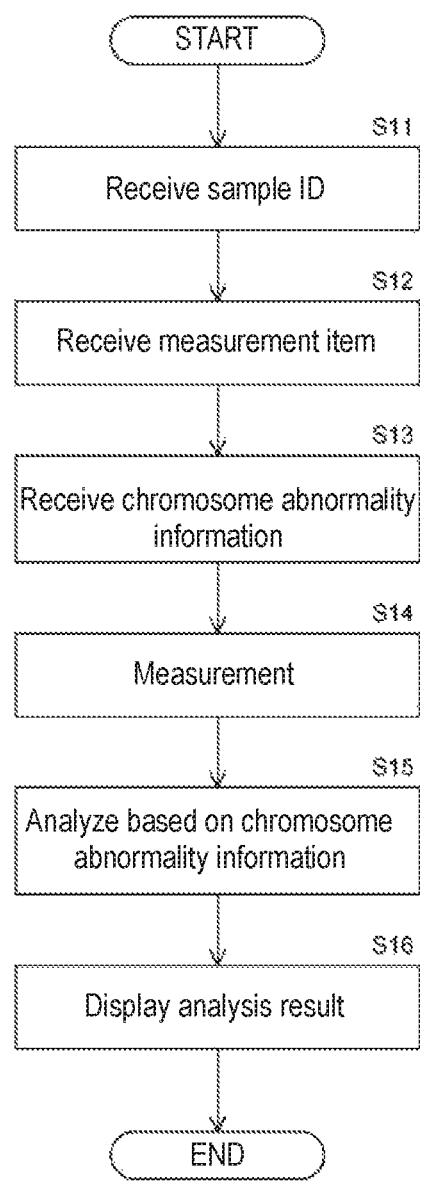
FIG. 10 is a flowchart showing the processes of the image analysis apparatus according to the first embodiment.
Figure 11A:
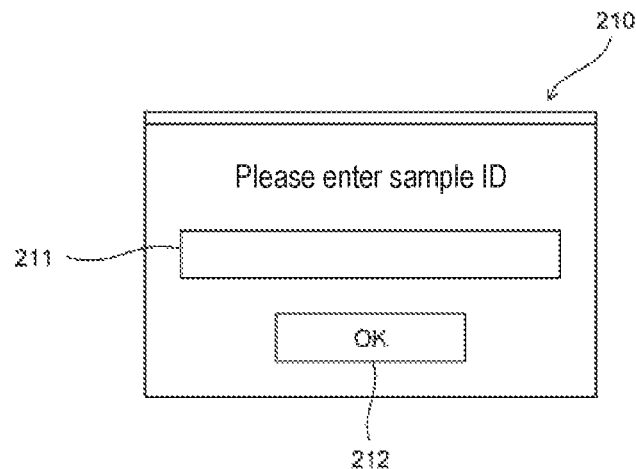
FIG. 11A is a diagram schematically showing a screen for accepting a sample ID according to the first embodiment.

As shown in FIG. 10, in step S11, the processing unit 11 of the image analysis apparatus 10 displays the screen 210 shown in FIG. 11A on the display unit 13, and accepts the sample ID from the operator via the screen 210.

As shown in FIG. 11A, the screen 210 includes a sample ID input area 211 and an OK button 212. The operator inputs the sample ID into the sample ID input area 211 via the input unit 14, and operates the OK button 212. In this way, the processing unit 11 accepts the sample ID input to the sample ID input area 211, and stores the accepted sample ID in the storage unit 12. Note that the sample ID may be automatically given by the processing unit 11 in response to an instruction from the operator.

Figure 11B:
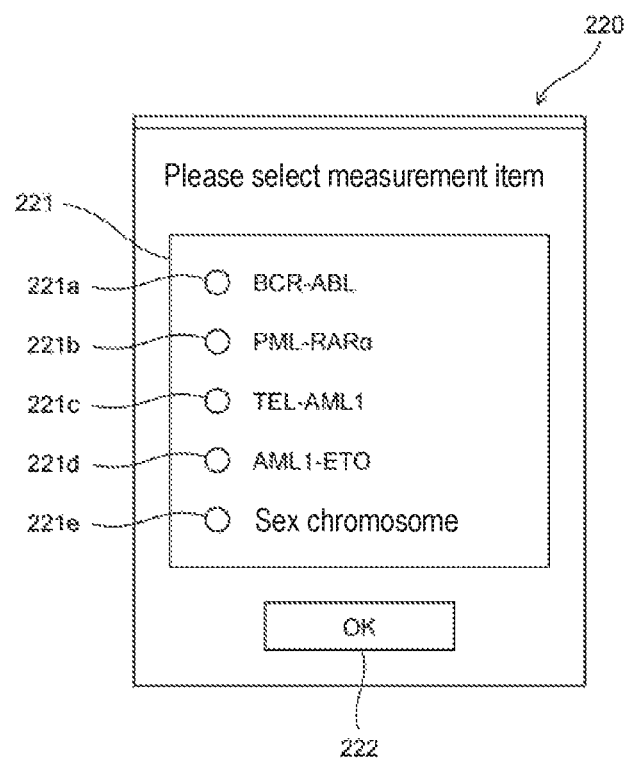
FIG. 11B is a diagram schematically showing a screen for accepting measurement items according to the first embodiment.

As shown in FIG. 10, in step S12 the processing unit 11 displays the screen 220 shown in FIG. 11B on the display unit 13, and accepts measurement items from the operator via the screen 220.

As shown in FIG. 11B, the screen 220 includes a measurement item selection area 221 and an OK button 222. The measurement item selection area 221 includes radial buttons 221a to 221e. Radial buttons 221a to 221e correspond to measurement items BCR-ABL, PML-RARα, TEL-AML1, AML1-ETO, and sex chromosomes, respectively. The operator operates any of the radio buttons 221a-221e to select one measurement item, and operates the OK button 222. In this way the processing unit 11 accepts the measurement item selected in the measurement item selection area 221, and stores the accepted measurement item in the storage unit 12.

As shown in FIG. 10, in step S13, the processing unit 11 acquires information on chromosome abnormality. "Information related to chromosomal abnormality" includes information on structural changes due to deletion, inversion, translocation, duplication and the like of chromosomes, information on mutations such as increase and decrease in the number of chromosomes, and names of diseases caused by chromosomal abnormalities. In step S13, the processing unit 11 may acquire subject information of the sample 21 as information on chromosome abnormality regarding the subject. Hereinafter, a case will be described in which subject information is obtained in step S13, and analysis is performed based on the acquired subject information in step S15 described later.

In step S13, the processing unit 11 displays one of the subject information reception screens shown in FIG. 12A to FIG. 14 on the display unit 13 according to the measurement item accepted in step S12, and receives the subject information from the operator via the displayed subject information reception screen.

Figure 12A:
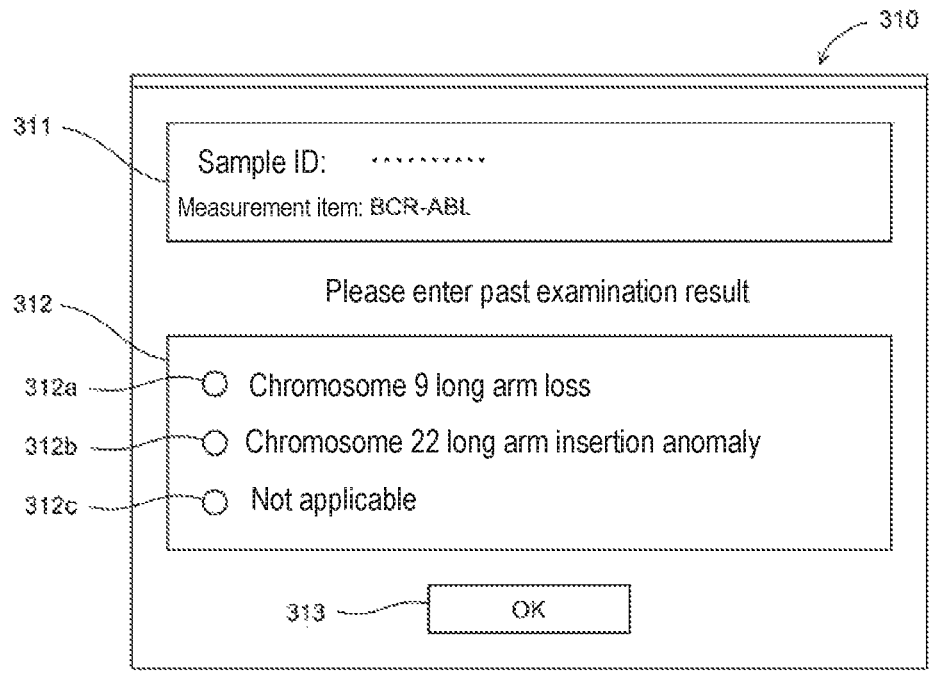
FIG. 12A is a diagram schematically showing a subject information reception screen in the case of measurement item BCR-ABL according to the first embodiment.

As shown in FIG. 12A, the subject information reception screen 310 is a screen displayed on the display unit 13 when BCR-ABL is selected as a measurement item. The subject information receiving screen 310 includes a sample information area 311, a subject information selection area 312, and an OK button 313.

The sample information area 311 displays the sample ID input in step S11, and the measurement items selected in step S12. The subject information selection area 312 includes radial buttons 312a to 312c for selecting past examination results made of the subject. Radial buttons 312a to 312c correspond to "Chromosome 9 Long Arm Loss", "Chromosome 22 Long Arm Insertion Abnormality", and "Not applicable", respectively. The radio button 312c is selected when the information does not correspond to past examination results corresponding to the radial buttons 312a, 312b. The operator operates and selects one of the radial buttons 312a to 312c, and operates the OK button 313. In this way the processing unit 11 accepts past examination results selected in the subject information selection area 312, and stores the accepted past examination results in the storage unit 12.

Figure 12B:
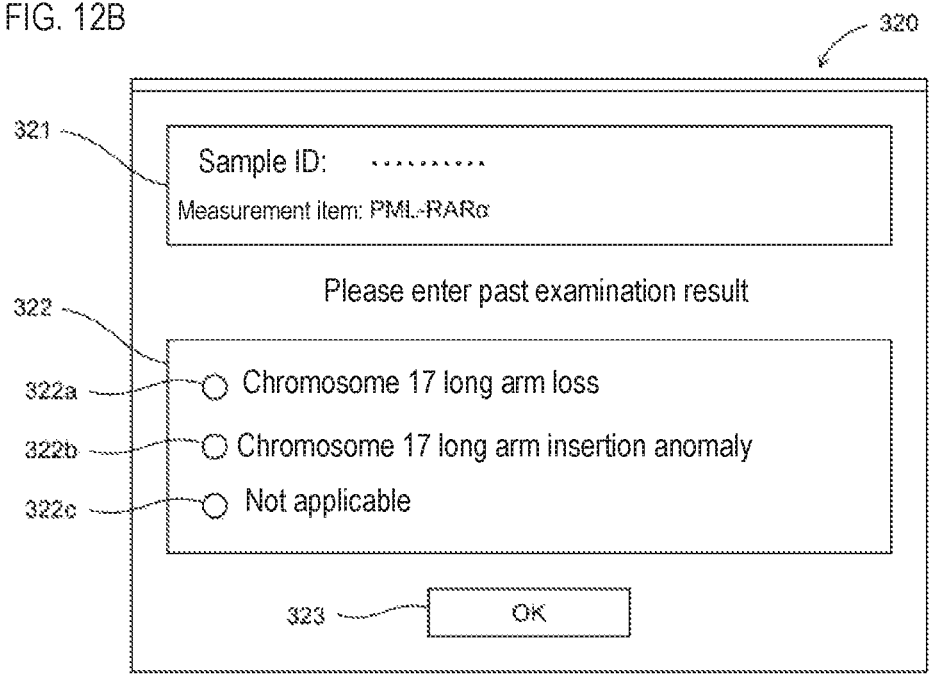
FIG. 12B is a diagram schematically showing the subject information reception screen in the case of the measurement item PML-RARα according to the first embodiment.

As shown in FIG. 12B, the subject information receiving screen 320 is a screen displayed on the display unit 13 when PML-RARα is selected as a measurement item. The subject information receiving screen 320 includes a sample information area 321, a subject information selection area 322, and an OK button 323.

The subject information selection area 322 includes radial buttons 322a to 322c for selecting past examination results of the subject. Radial buttons 322a to 322c correspond to "Chromosome 17 Long Arm Loss", "Chromosome 17 Long Arm Insertion Abnormality", and "Not applicable", respectively. The radio button 322c is selected when the information does not correspond to past examination results corresponding to the radio buttons 322a, 322b, The operator selects and operates one of the radial buttons 322a to 322c, and operates the OK button 323. In this way, the processing unit 11 accepts the past inspection results selected in the subject information selection area 322, and stores the accepted past examination results in the storage unit 12.

Figure 13A:
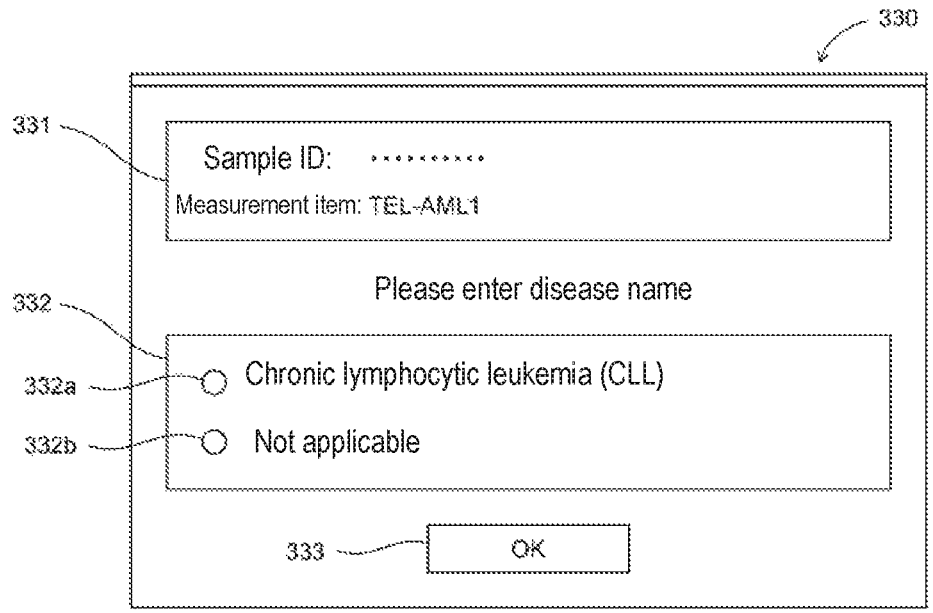
FIG. 13A is a diagram schematically showing a subject information reception screen in the case of measurement item TEL-AML1 according to the first embodiment.

As shown in FIG. 13A, the subject information receiving screen 330 is a screen displayed on the display unit 13 when TEL-AML1 is selected as a measurement item. The subject information receiving screen 330 includes a sample information area 331, a subject information selection area 332, and an OK button 333.

The subject information selection area 332 includes radial buttons 332a and 332b for selecting the name of the disease affecting the subject. Radial buttons 332a, 332b correspond to "chronic lymphocytic leukemia (CLL)" and "not applicable", respectively. The radio button 332b is selected when the information does not correspond to the disease name corresponding to the radio button 332a. The operator selects and operates one of the radial buttons 332a and 332b, and operates the OK button 333. In this way the processing unit 11 accepts the disease name selected in the subject information selection area 332, and stores the accepted disease name in the storage unit 12.

Figure 13B:
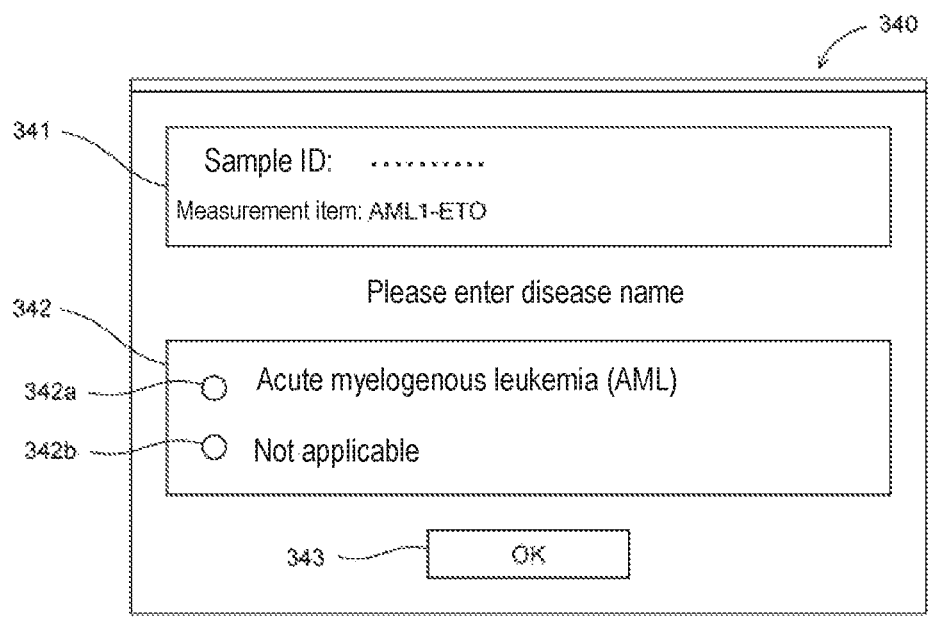
FIG. 13B is a diagram schematically showing a subject information reception screen in the case of the measurement item AML1-ETO according to the first embodiment.

As shown in FIG. 13(b), the subject information receiving screen 340 is a screen displayed on the display unit 13 when AML1-ETO is selected as the measurement item. The subject information receiving screen 340 includes a sample information area 341, a subject information selection area 342, and an OK button 343.

The subject information selection area 342 includes radial buttons 342a and 342b for selecting the name of a disease affecting the subject. Radial buttons 342a, 342b correspond to "acute myelogenous leukemia (AML)" and "not applicable", respectively. The radio button 342b is selected when the information does not correspond to the disease name corresponding to the radio button 342a. The operator selects and operates one of the radial buttons 342a and 342b, and operates the OK button 343. In this way the processing unit 11 accepts the disease name selected in the subject information selection area 342, and stores the accepted disease name in the storage unit 12.

Figure 14:
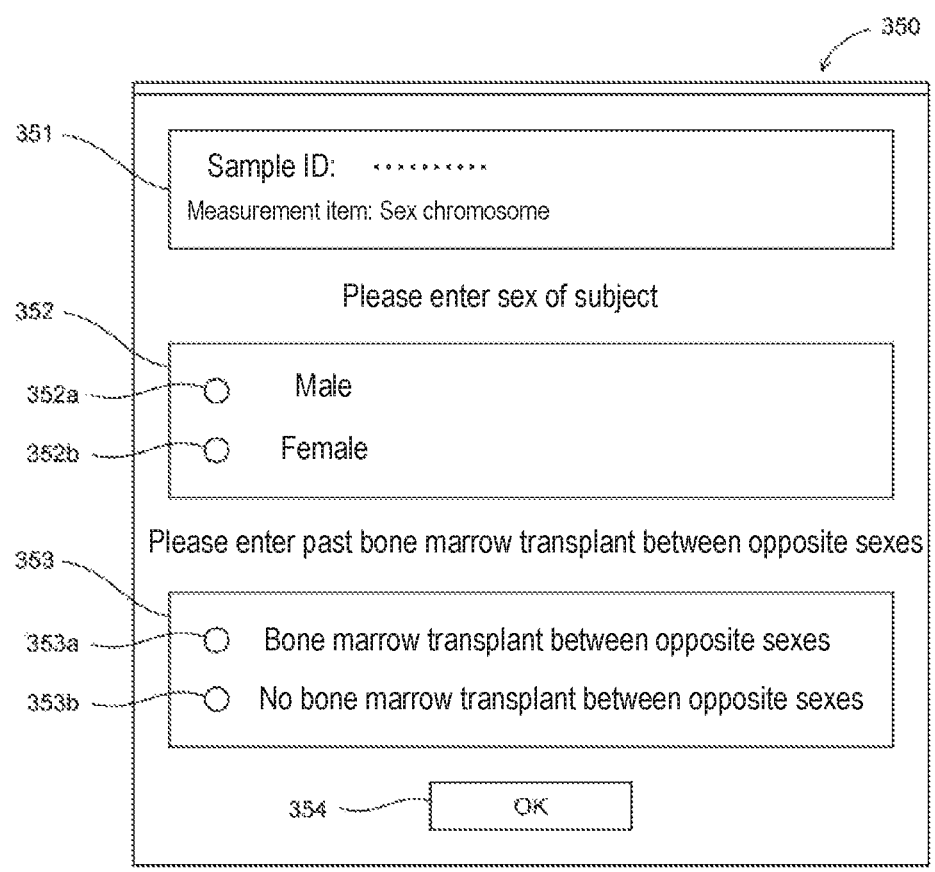
FIG. 14 is a diagram schematically showing a subject information reception screen in the case of measurement item chromosomes according to the first embodiment.

As shown in FIG. 14, the subject information receiving screen 350 is a screen displayed on the display unit 13 when a sex chromosome is selected as a measurement item. The subject information receiving screen 350 includes a sample information area 351, subject information selection areas 352 and 353, and an OK button 354.

The subject information selection area 352 includes radial buttons 352a and 352b for selecting the sex of the subject. Radial buttons 352a, 352b correspond to "male" and "female", respectively. The subject information selection area 353 includes radio buttons 353a and 353b for selecting presence or absence of bone marrow transplant between opposite sexes. Radial buttons 353a and 353b correspond to "bone marrow transplant between opposite sexes" and "no bone marrow transplant between opposite sexes", respectively. The operator selects and operates one of the radial buttons 352a and 352b, and operates and selects one of the radio buttons 353a and 353b. Then, the operator operates the OK button 354. In this way the processing unit 11 accepts the sex of the subject selected in the subject information selection area 352 and the presence or absence of bone marrow transplant between the opposite sexes selected in the subject information selection area 353, and stores the accepted information in the storage unit 12.

As shown in FIG. 10, when the processing unit 11 receives a measurement start instruction from the operator via the input unit 14, the processing unit 11 measures the sample 21 in step S14. In this way the sample 21 is caused to flow through the flow cell 110, light from the light sources 121 to 124 is irradiated on the sample 21 flowing through the flow cell 110, and the fluorescence of the wavelengths $\lambda 21$ to $\lambda 23$ and light of wavelength $\lambda 14$ generated from the sample 21 flowing through the flow cell 110 are imaged. Then, as described above, the processing unit 11 extracts bright spots from the fluorescence images, corrects the color tone of the fluorescence images, and generates a composite image.

In step S15, the processing unit 11 performs analysis based on the information on the chromosome abnormality acquired in step S13. As described above, in step S15 in this case, the processing unit 11 performs analysis based on the subject information acquired in step S13. Specifically, as described with reference to FIGS. 3A to 9D, the processing unit 11 calculates the bright spots in the fluorescence image based on the subject information acquired in step S13, to determine whether each cell is an abnormal cell.

At this time, the processing section 11 reads and selects from the storage unit 12 the combination of the numbers of the bright spots of each color corresponding to the subject information, and compares the selected combination of the numbers of the bright points for each color and the combination of the number of bright spots of each color acquired from the cell. In this way it is possible to properly analyze the bright spots in the composite image based on the read combination of the numbers of the bright spots of each color corresponding to the subject information. The operator does not need to perform a complicated operation of selecting a combination of the numbers of the bright spots of each color since this analysis processing is automatically performed by the processing unit 11.

The storage unit 12 stores combinations of the numbers of the respective bright spots of each color corresponding to the subject information for each measurement item, and the processing unit 11 reads the measurement items set for the sample 21 and the combination of the numbers of the bright spots of each color corresponding to the subject information from the storage unit 12. In this way the processing unit 11 can properly analyze the bright spots in the composite image using the combination of the number of appropriate bright spots of each color corresponding to the measurement item.

In step S15, the processing unit 11 also generates an analysis result based on the determination result made for each cell. Specifically, abnormal cell number, abnormal cell ratio, normal cell number, normal cell ratio, indeterminable cell number, and indeterminable cell ratio are calculated. The number of abnormal cells is the number of cells determined to be abnormal in determining whether abnormal cells are present, and the number of normal cells is the number of cells determined to be normal in determining whether normal cells are present. The abnormal cell ratio is a value obtained by dividing the number of abnormal cells by the sum of the number of abnormal cells and the number of normal cells, and the normal cell ratio is a value obtained by dividing the number of normal cells by the sum of the number of abnormal cells and the number of normal cells. The number of indeterminable cells is the number of cells that did not meet any abnormality or normal combination of the number of bright spots of each color obtained from the cells in determining whether the cell is an abnormal or normal cell. The indeterminable cell ratio is a value obtained by dividing the number of indeterminable cells by the sum of the number of abnormal cells, the number of normal cells, and the number of indeterminable cells.

In step S16, the processing unit 11 causes the display unit 13 to display the screen 410 including the analysis result generated in step S15.

Figure 15:
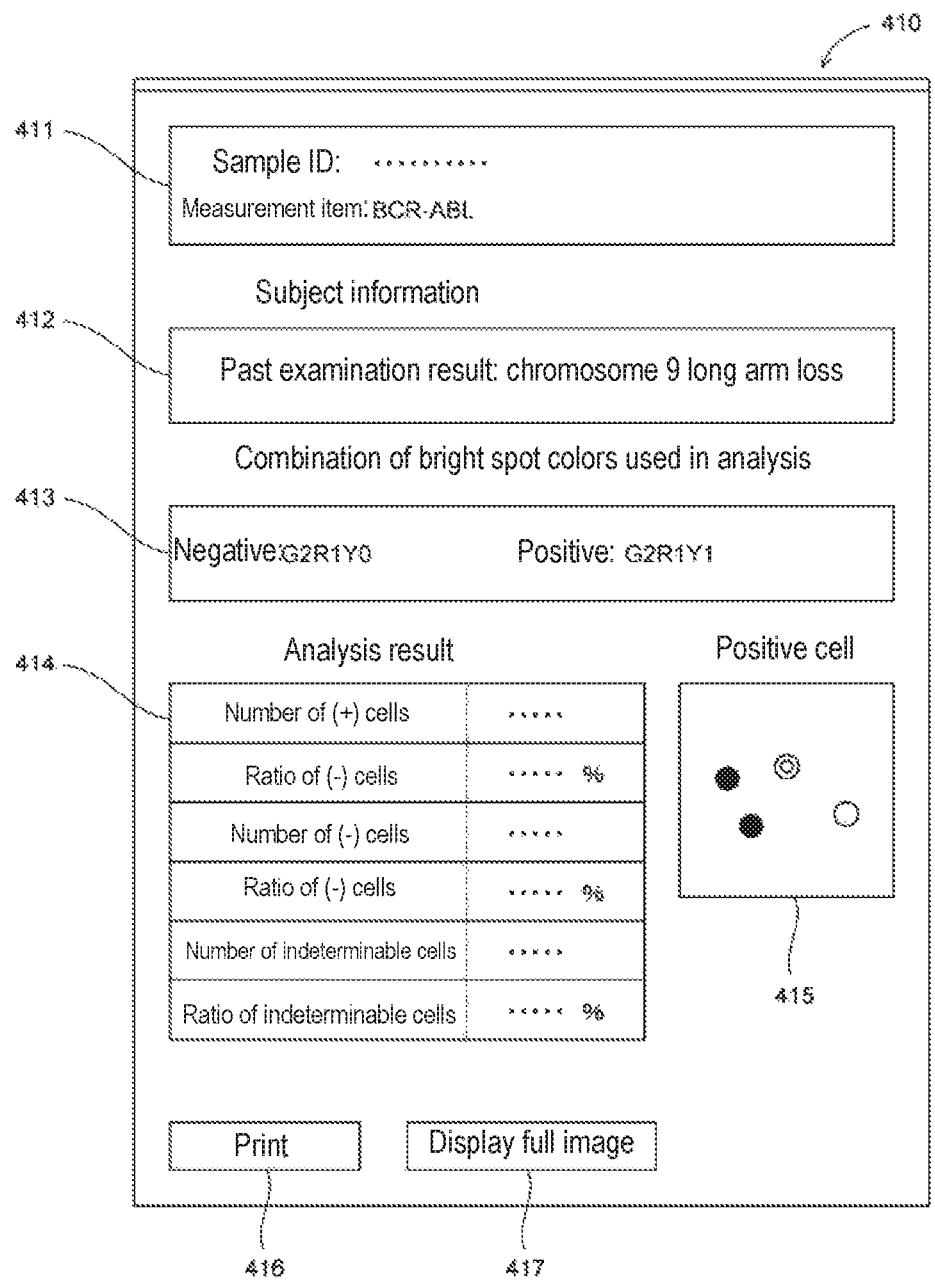
FIG. 15 is a diagram schematically showing a screen for displaying analysis results and the like according to the first embodiment.

As shown in FIG. 15, the screen 410 includes a sample information area 411, a subject information area 412, a bright spot information area 413, an analysis result list 414, an image 415, a print button 416, a full image display button 417.

The sample information area 411 displays the sample ID and measurement items. The subject information area 412 displays the subject information input in step S13. The bright spot information region 413 displays a combination of numbers of bright spots for each color used in the analysis of step S15. In the example shown in FIG. 15, since the measurement item is BCR-ABL and the subject information is "Chromosome 9 arm missing", "G2R1Y0" and "G2R1Y1" shown in FIGS. 6A and 6B are displayed as combinations of the number of bright spots used in the analysis. The analysis result list 414 displays the analysis result generated in the analysis of step S15. The image 415 is a representative composite image corresponding to positive cells in the composite image generated based on the sample 21.

Note that when the measurement item is a sex chromosome, "positive" is replaced with "abnormal" and "negative" is replaced with "normal" on the screen showing the analysis result.

When the operator desires to print the contents of the screen 410, the operator operates the print button 416. Through this operation, the processing unit 11 prints the contents of the screen 410 on paper by a printer (not shown) connected to the image analysis device 10.

By displaying the analysis result on the display unit 13 and printing the analysis result on the paper, the operator can use, for example, the number of abnormal cells referred to or the abnormal cell ratio for diagnosis of the subject from whom the sample 21 was prepared.

When the operator desires to display all composited images, the operator operates the full image display button 417. By this operation, the processing unit 11 displays the screen 420 shown in FIG. 16 on the display unit 13.

Figure 16:
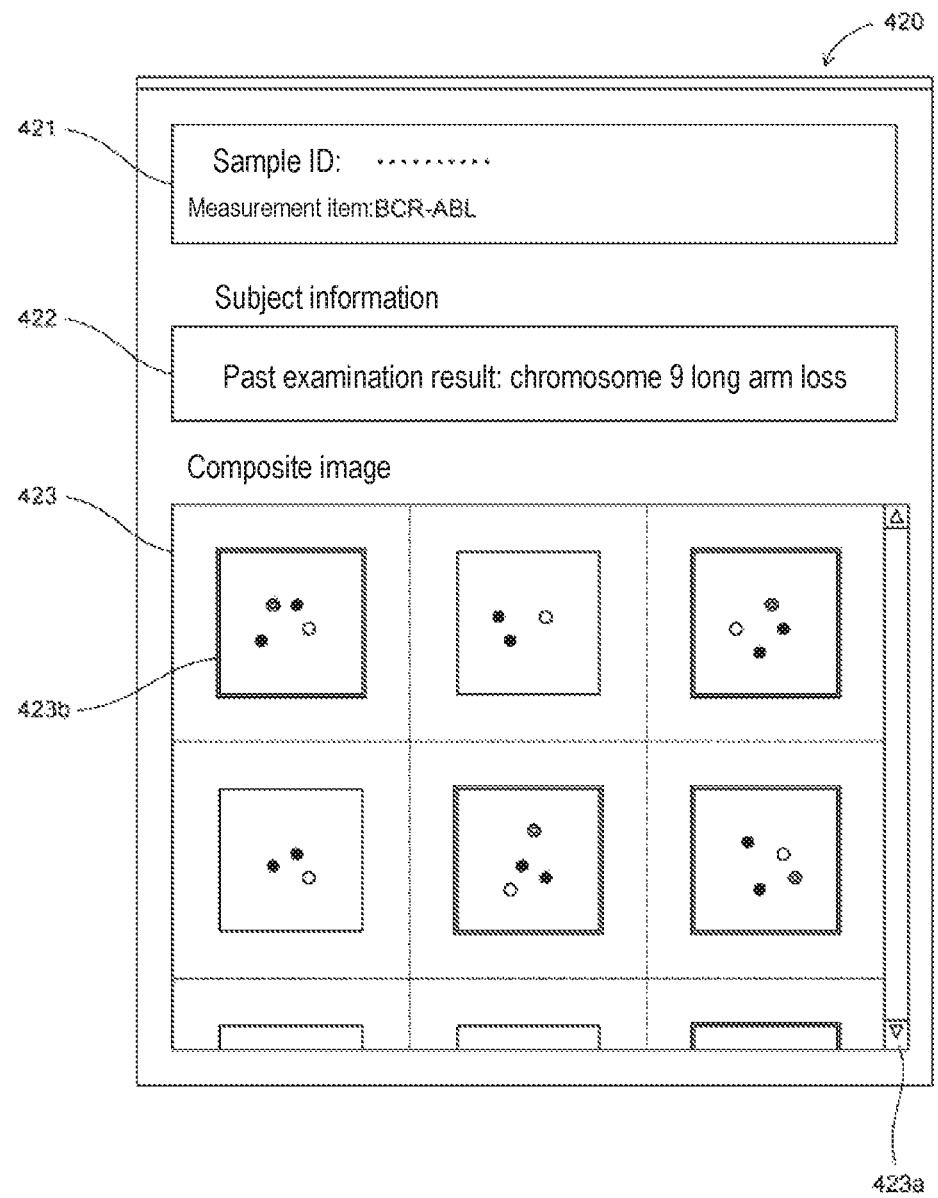
FIG. 16 is a diagram schematically showing a screen for displaying all the synthesized images and the like according to the first embodiment.

As shown in FIG. 16, the screen 420 includes a sample information area 421, a subject information area 422, and a composite image area 423.

The sample information area 421 and the subject information area 422 are the same as the sample information area 411 and the subject information area 412 of the screen 410 shown in FIG. 15. The composite image area 423 displays all composite images generated based on the sample 21. The operator can display all the composite images in the composite image area 423 by operating the operation unit 423*a* provided at the right end of the composite image area 423.

A frame 423*b* is provided in the composite image based on the cells determined to be positive among the composite images displayed in the composite image area 423. The operator can visually grasp which composite image corresponds to the positive cell by providing the frame 423*b* in the composite image. Note that when the measurement item is a sex chromosome, a frame 423*b* is provided in the composite image based on abnormal cells.

In this way when the composite image is displayed on the screen 420, the operator can use the referenced composite image in the diagnosis of the subject from whom the sample 21 was acquired. Note that not only the composite image, but also the fluorescence image of the first gene and the fluorescence image of the second gene may be displayed on the screen 420.

Second Embodiment

Figure 17A:
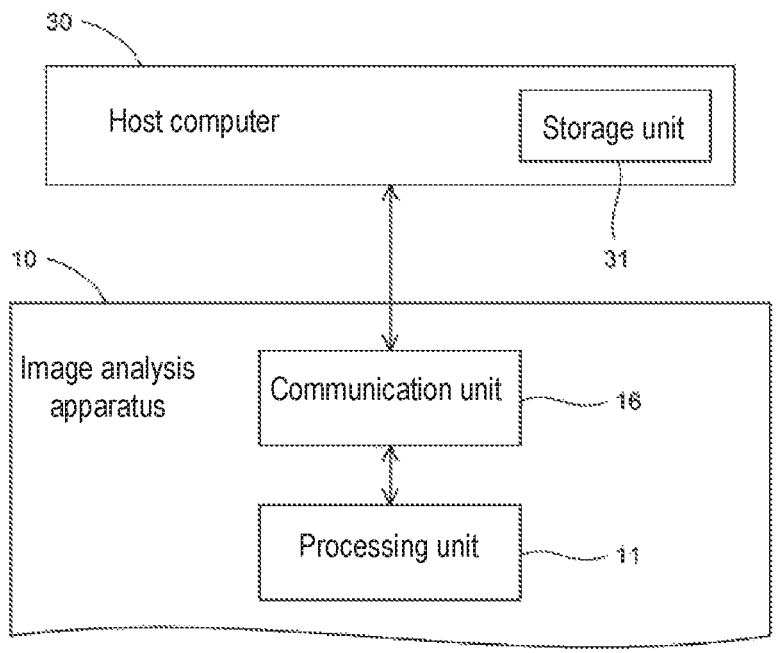
FIG. 17A is a diagram schematically showing a configuration of an image analysis apparatus and a host computer according to a second embodiment.

As shown in FIG. 17A, the image analysis apparatus 10 is communicably connected to a host computer 30 in the second embodiment. The image analysis apparatus 10 of the second embodiment includes a communication unit 16 in addition to the configuration of the first embodiment. The communication unit 16 is configured by a network adapter or the like. The processing unit 11 communicates with the host computer 30 via the communication unit 16. The host computer 30 is an external computer different from the image analysis apparatus 10. The host computer 30 includes a storage unit 31. The storage unit 31 stores measurement items and subject information in advance in association with the sample ID.

Figure 17B:
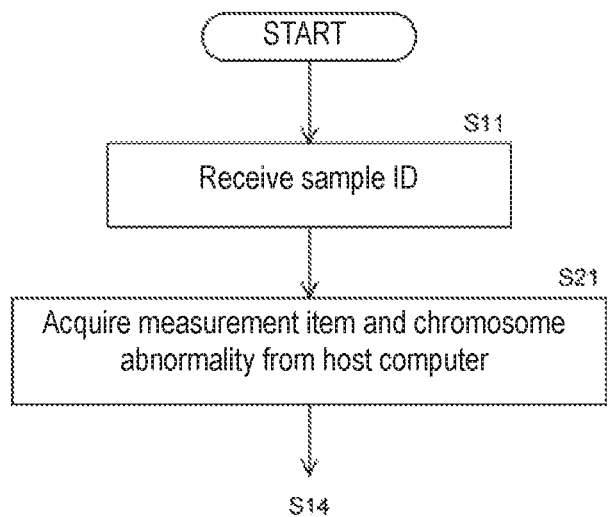
FIG. 17B is a flowchart showing the processes of the image analysis apparatus according to the second embodiment.

As shown in FIG. 17B, in the second embodiment step S21 is added to replace steps S12 and S13 as compared with the processing of the first embodiment shown in FIG. 10.

In step S21, the processing unit 11 acquires measurement items and information on chromosome abnormality from the host computer 30. In step S21 in this case, the processing unit 11 acquires the measurement item and the subject information based on the sample ID accepted in step S11. Specifically, the processing unit 11 transmits an acquisition request including the sample ID to the host computer 30. The host computer 30 reads the corresponding measurement item and subject information from the storage unit 31 based on the sample ID included in the received acquisition request, and transmits the sample ID and the read information to the image analysis apparatus 10. In this way the processing unit 11 acquires measurement items and subject information as in steps S12 and S13 of the first embodiment.

In the second embodiment, similarly to the first embodiment, the processing unit 11 analyzes the bright spots of the composite image based on the acquired subject information. Therefore, the bright spots in the composite image can be analyzed appropriately even if the bright spots of the composite image change. Since it is not necessary for the operator to input measurement items and subject information, operator's labor also can be omitted and analysis can be started quickly.

Third Embodiment

Figure 18:
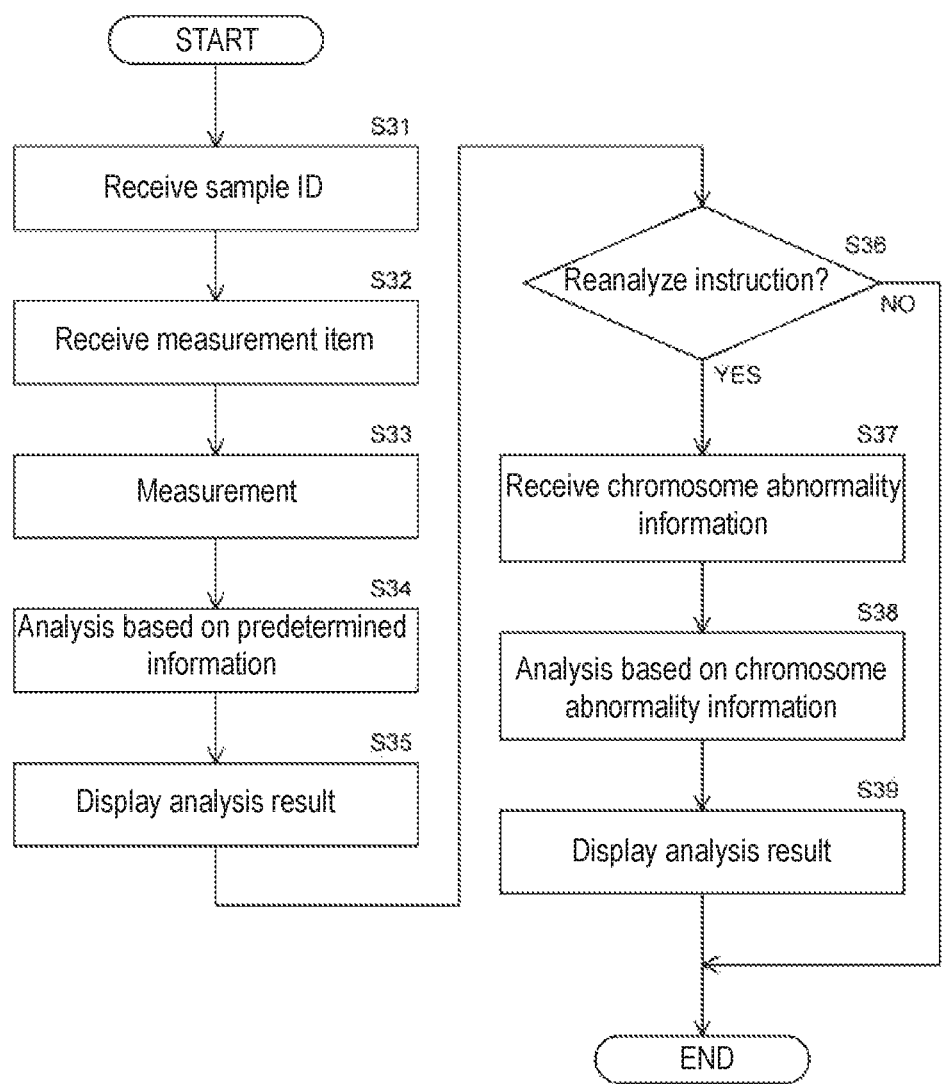
FIG. 18 is a flowchart showing the processes of the image analysis apparatus according to a third embodiment.
Figure 19:
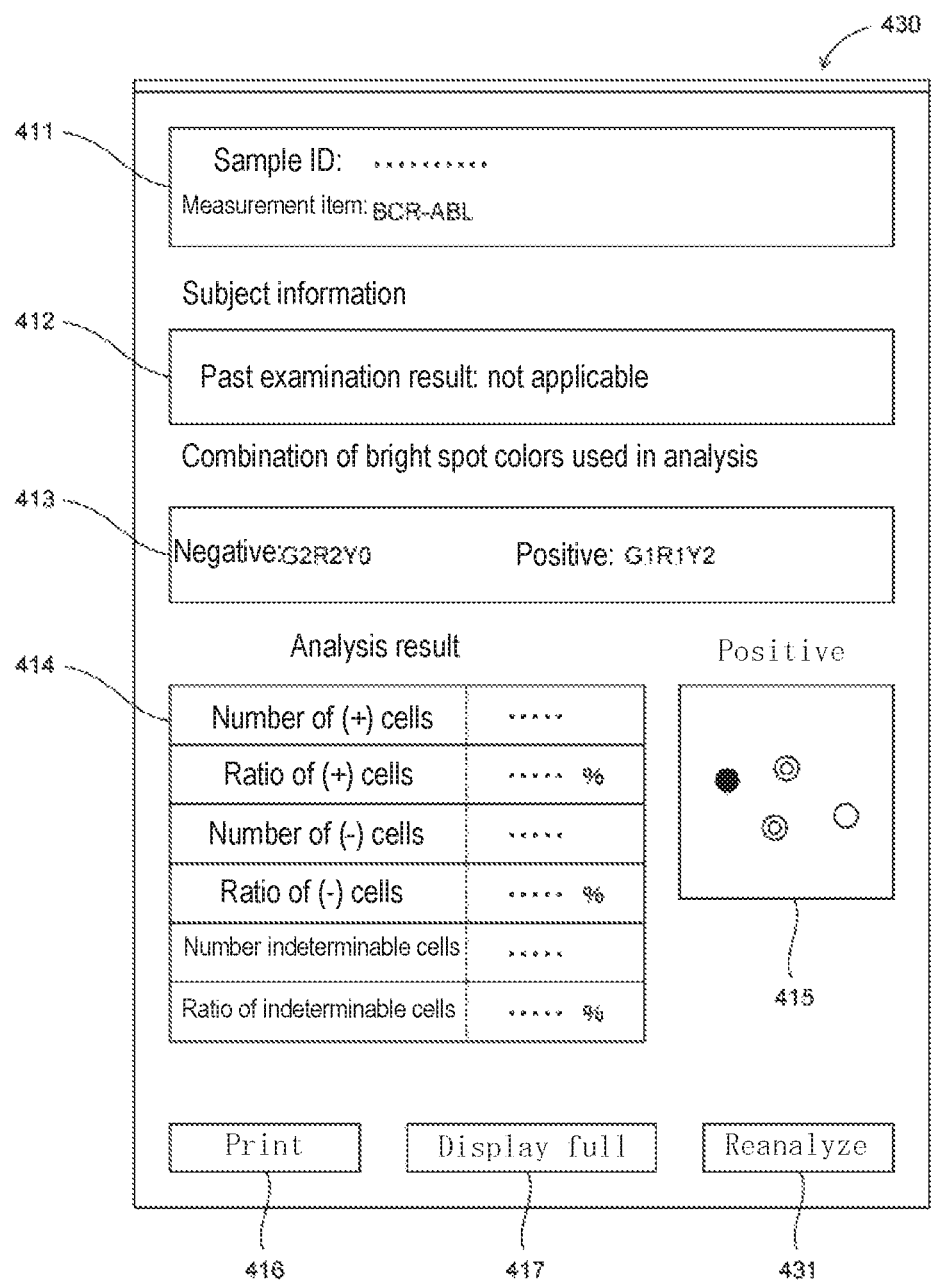
FIG. 19 is a diagram schematically showing a screen for displaying analysis results and accepting reanalysis according to the third embodiment.
Figure 20:
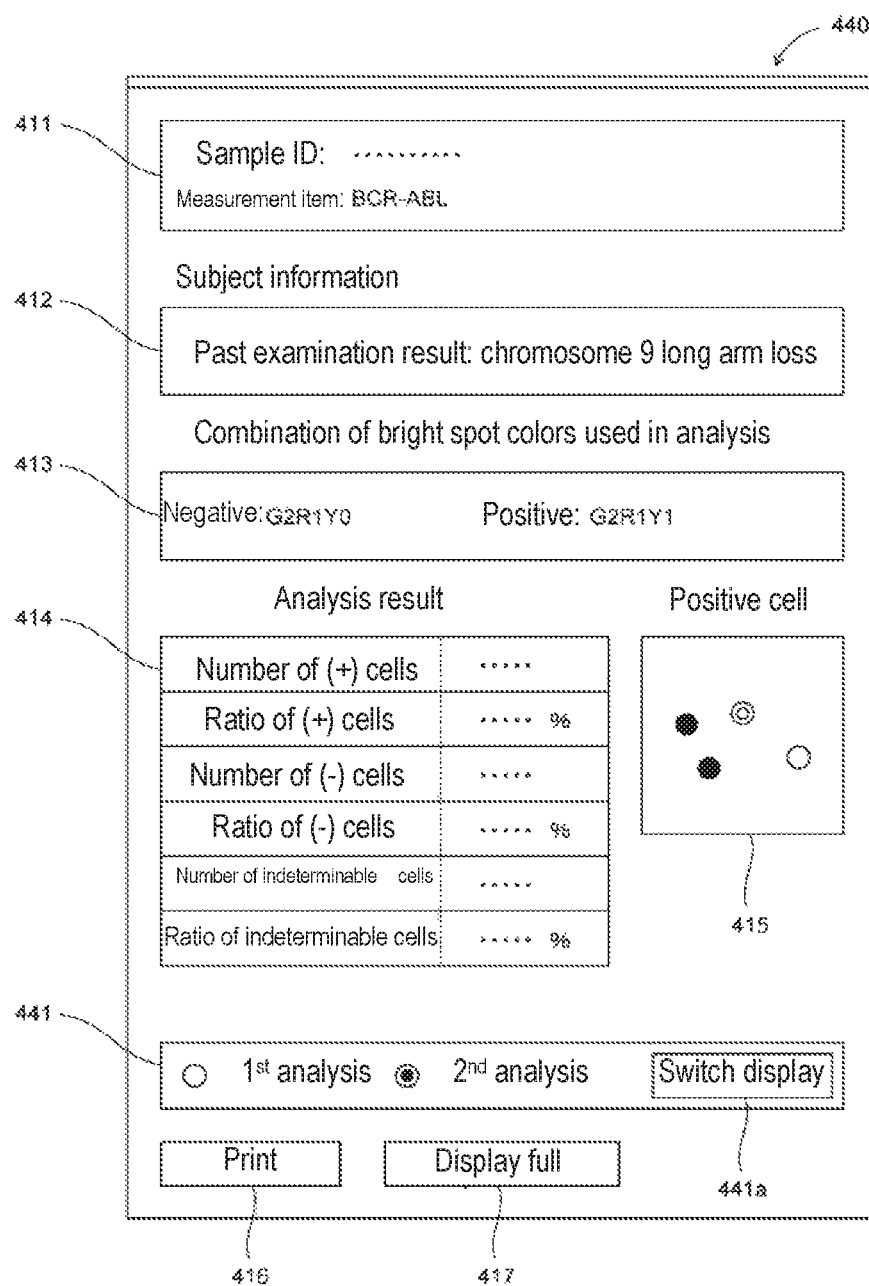
FIG. 20 is a diagram schematically showing a screen for displaying all synthesized images and accepting switching of analysis results according to the third embodiment.
Figure 21:
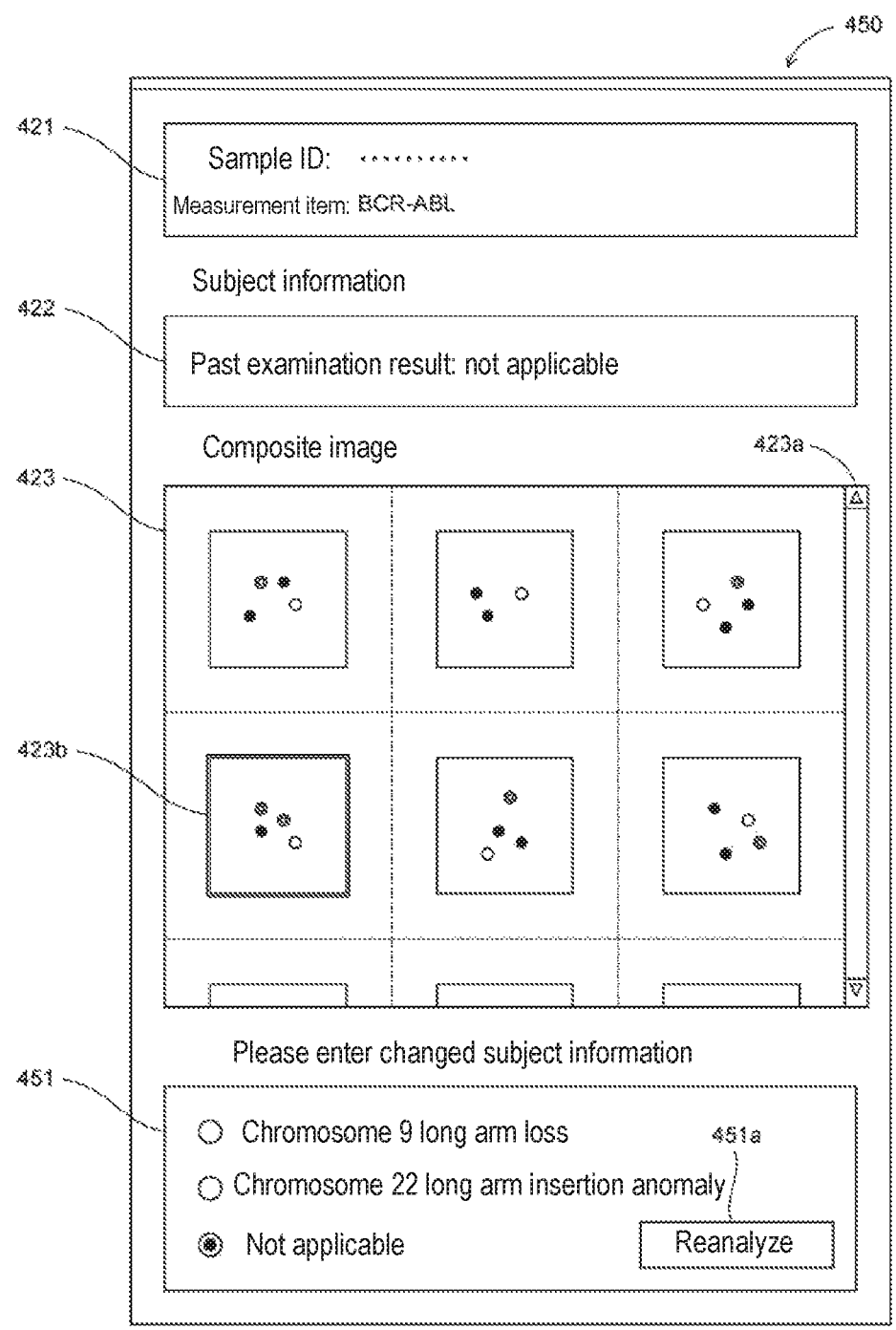
FIG. 21 is a diagram schematically showing a screen for displaying all the synthesized images and for receiving subject information and reanalysis according to the third embodiment.

In the third embodiment, the process of the first embodiment shown in FIG. 10 is changed to the process shown in FIG. 18, the screen 410 showing the analysis result is changed as shown in FIGS. 19 and 20, and the screen 420 displaying the entire image is changed as shown in FIG. 21. Other configurations of the third embodiment are similar to those of the first embodiment.

As shown in FIG. 18, in steps S31 and S32, the processing unit 11 accepts the sample ID and measurement items in the same manner as in steps S11 and S12 of FIG. 10. Subsequently, the processing unit 11 does not receive the subject information, and measures the sample in step S33 in the same manner as step S14 in FIG. 10.

In step S34, the processing unit 11 analyzes bright spots in the composite image based on predetermined information for each of a plurality of cells included in the sample 21. Specifically, the processing unit 11 compares the combination of the number of the bright spots in the composite image generated based on the cells for each color and the combination of the numbers of the bright spots for each color in the normal case, and determines whether the cell is positive or negative relative to the measurement item.

For example, in the case where the measurement item is BCR-ABL, the processing unit 11 determines whether the combination of the number of the bright spots of each color based on the cells matches "G2R2Y0" and "G1R1Y2" in the normal case shown in FIGS. 3A and 3B, and determines whether each cell is positive or negative. That is, similar to the case where the subject information is "not applicable" and "no bone marrow transplant between opposite sexes" in the first embodiment, the processing unit 11 determines whether each cell is an abnormal cell based on the combination of the number of bright spots of each color regardless of the subject information. Then, as in step S15 of FIG. 10, the processing unit 11 generates an analysis result based on the determination result.

In step S35, the processing unit 11 causes the display unit 13 to display the screen 430 including the analysis result generated in step S34.

As shown in FIG. 19, the screen 430 displayed in step S35 also is provided with a reanalysis button 431 as compared with the screen 410 shown in FIG. 15. On the screen 430, "N/A" in the normal case is displayed as the subject information in the subject information area 412, and a combination of the numbers of the bright spots for each color in the normal case is displayed in the bright spot information area 413.

As described above, it is possible to quickly and easily determine whether each cell is abnormal when the processing unit 11 does not receive the subject information but analyzes the bright spots based on the predetermined information. The screen 410 shown in FIG. 19 also can be promptly displayed.

Here, regardless of the presence of the subject information to be input, the number of indeterminable cells or the indeterminable cell ratio may increase when analyzed without accepting the subject information as described above. That is, in such a case the combination of the number of bright spots of each color acquired from the cells does not match the combination of the number of the bright spots of each color corresponding to the normal information, and the number of indeterminable cells or indeterminable cell ratio increases. Therefore, according to the number of indeterminable cells or the indeterminable cell ratio, it is possible to determine the reliability of the analysis performed by using the combination of the number of the bright spots for each color in the normal case. When the number of indeterminable cells or the indeterminable cell ratio increases, it is considered that the combination of the number of bright spots of each color is different from usual. Therefore, it is preferable to determine the combination of the numbers of the bright spots of each color acquired from the cell using the combination of the number of the bright spots for each color based on the subject information as in the first embodiment.

From this perspective, the image analyzing apparatus 10 of the third embodiment is configured such that analysis is performed based on subject information when an instruction for reanalysis is received from the operator while analyzing rapidly using the combination of the numbers of the normal bright spots of each color at the time of the initial analysis. The operator operates the reanalysis button 431 on the screen 430 when the number of indeterminable cells or the indeterminable cell ratio is increasing and confirmed through reference to the analysis result list 414.

When the reanalysis button 431 is operated in step S36, the processing unit 11 advances the process to step S37 when receiving an instruction of reanalysis from the operator. On the other hand, when the reanalysis button 431 is not operated and a button (not shown) for closing the screen 430 is operated, the process of FIG. 18 ends.

In step S37, the processing unit 11 receives information on chromosome abnormality. In step S37 in this case, the processing unit 11 accepts subject information as in step S13 of FIG. 10. Then, in step S38, the processing unit 11 performs analysis based on information on chromosome abnormality. In this case, in step S38 the processing unit 11 performs analysis based on the subject information, similarly to step S15 in FIG. 10, using the composite image generated in step S33. Since the analysis is performed based on the subject information in step S38, the reliability of the analysis in step S38 is higher than the reliability of the analysis in step S34. In step S39 the processing unit 11 causes the display unit 13 to display a screen 440 including the analysis result generated in step S38.

As shown in FIG. 20, the screen 440 displayed in step S39 has a switching area 441 in addition to the screen 410 shown in FIG. 15. In the example shown in FIG. 20, "Chromosome 9 Long Arm Loss" is displayed as the subject information received in step S37 in the subject information area 412, and in the bright spot information area 413 a combination of the numbers of the bright spots of each color corresponding to the subject information is displayed.

The switching area 441 includes a radio button for selecting the first time, that is, the analysis result generated in step S34, a radio button for selecting the analysis result generated the second time, that is, the analysis result generated in step S38, and a display switching button 441*a*. The operator operates the display switching button 441*a* by operating a radio button corresponding to the analysis result to be displayed.

When the display switching button 441 a is operated after the corresponding radio button is selected for the first time, the processing unit 11 displays "not applicable" or "no bone marrow transplant of opposite sexes" indicating that the analysis was performed based on the normal subject information in the subject information area 412 on the screen 440, and a combination of the numbers of the normal bright spots of each color used for the analysis in step S34 is displayed in the bright spot information area 413 and the analysis result generated in the analysis in step S34 is displayed in the analysis result list 414. When the display switching button 441*a* is operated after the corresponding radio button is selected for the second time, the processing unit 11 displays the subject information received in step S37 in the subject information area 412 on the screen 440, and a combination of the numbers of the bright spots of each color used for the analysis in step S38 is displayed in the bright spot information region 413 and the analysis result generated in the analysis in step S38 is displayed in the analysis result list 414.

In this way, when the first analysis result and the second analysis result are displayed on the screen 440 in a switchable manner, the operator can compare the two analysis results and determine the more appropriate analysis result as the final result.

In the third embodiment, the operator can also input an instruction of reanalysis from a screen displaying all images. When the full image display button 417 is operated by the operator on the screen 430 shown in FIG. 19, the processing unit 11 displays the screen 450 shown in FIG. 21 on the display unit 13.

As shown in FIG. 21, the screen 450 also includes a subject information change area 451 as compared with the screen 420 shown in FIG. 16. The subject information change area 451 includes a radio button capable of selecting subject information corresponding to the measurement item, and a reanalysis button 451*a* for instructing reanalysis based on the selected radio button. In the example shown in FIG. 16, in the first analysis, the subject information area 422 indicates that the analysis was performed without using the special subject information.

When the operator selects the radio button of the subject information change area 451, the processing unit 11 changes the frame 423*b* indicating the abnormality provided in the composite image in the composite image area 423 based on the subject information selected in the subject information change area 451. The operator selects the radio button of the subject information change area 451 and determines whether reanalysis should be performed while confirming that the frame 423*b* indicating abnormality is switched. When the operator desires to reanalyze, the operator operates the reanalysis button 451*a*. At this time, the radio button selected in the subject information change area 451 becomes the subject information used in the reanalysis.

In step S36, when the reanalysis button 451*a* is operated, the processing unit 11 advances the process to step S37 when an instruction of reanalysis is received from the operator. In this case, in step S37 the processing unit 11 receives subject information corresponding to the radio button selected in the subject information change area 451. Then, the processing unit 11 performs analysis based on the subject information in step S38, and causes the display unit 13 to display the screen 440 including the analysis result in step S39.

In this way, when the screen 450 for displaying all the images is configured to receive the reanalysis instruction, the operator can input the reanalysis instruction while referring to the composite image. The frame 423*b* provided in the composite image in the composite image area 423 is reset by selecting the radio button in the subject information change area 451. In this way the operator can examine appropriate subject information and input an instruction of reanalysis.

In the third embodiment, it is also possible to display a screen 450 for displaying all images from the screen 460 showing the analysis result for each sample ID. When the operator operates a menu or the like (not shown) displayed on the display unit 13, the processing unit 11 displays the screen 460 on the display unit 13.

As shown in FIG. 22, the screen 460 includes a list 461 and a full image display button 462. The list 461 displays the analysis result for each sample ID. The list 461 includes an operation unit 461*a* for vertically moving the display contents in the list 461 and an operation unit 461*b* for moving the display contents in the list 461 in the left and right directions. All the samples can be displayed on the list 461 by operating the operation unit 461*a*, and the operator can display all analysis results associated with the sample ID by operating the operation unit 461*b*. In the list 461, for the sake of convenience, only the abnormal cell ratio and the indeterminable cell ratio are shown as the analysis result.

In the example shown in FIG. 22, both the abnormal cell ratio and the indeterminable cell ratio are invariably small in the sample IDs "001234" to "001238" and "001241". Therefore, the operator can judge that these sample IDs are properly normal. Also, at sample ID "001240", the abnormal cell ratio is large and the indeterminable cell ratio is small. Therefore, the operator can properly judge this sample ID to be abnormal.

On the other hand, with the sample ID "001239", the abnormal cell ratio is small and the indeterminable cell ratio is large. Therefore, the operator cannot determine that this sample ID is properly normal. When the indeterminable cell ratio is high or the number of indeterminable cells is large, there is a high possibility that the subject information is inappropriate. For example, in the case where the measurement item is TEL-AML1, although "chronic lymphocytic leukemia" should be selected as subject information, analysis is performed based on "not applicable" of normal subject information.

When the indeterminable cell ratio and the indeterminable cell number are greater than a predetermined value as described above, the operator selects the sample ID by operating the line of the sample ID. When the sample ID is selected, a frame 461*c* is displayed in the row of the target sample ID in the list 461. The operator selects the sample ID and operates the full image display button 462. In this way the processing unit 11 displays the screen 450 shown in FIG.

21 on the display unit 13, and displays the analysis result on the selected sample ID on the screen 450. Then, the operator examines other subject information as described above and inputs a reanalysis instruction as necessary on the displayed screen 450.

According to the screen 460 of FIG. 22, the operator can display the screen 450 displaying all images with reference to the analysis result for each sample ID. In this way it is possible to smoothly confirm the composite image and input an instruction of reanalysis for a plurality of sample IDs.

Fourth Embodiment

Figure 23:
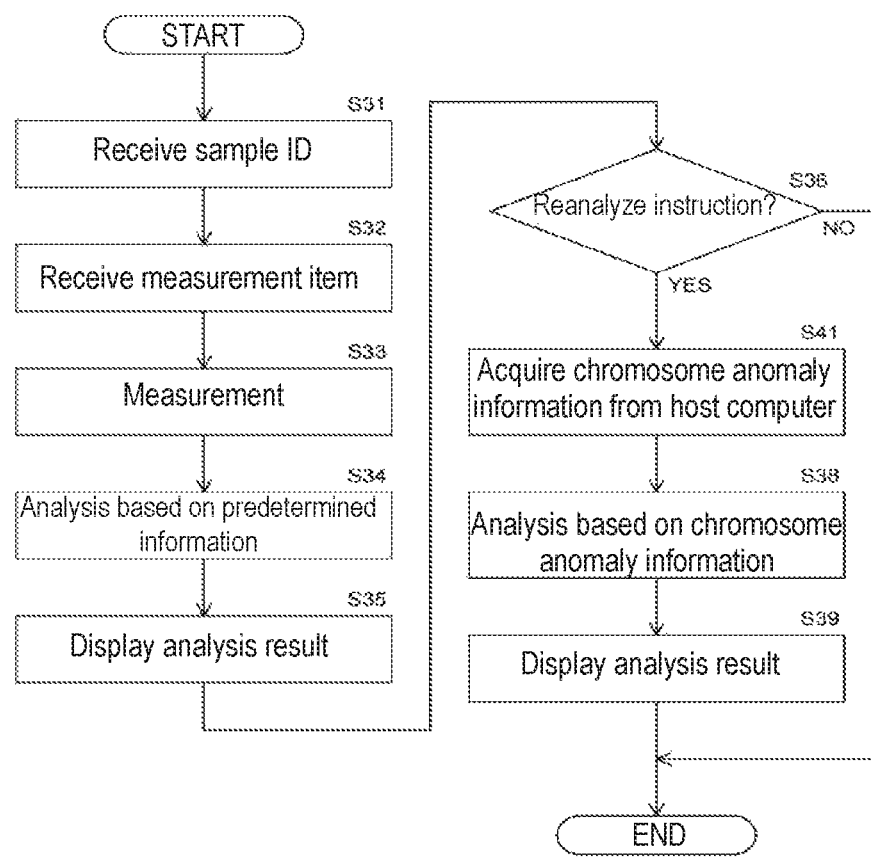
FIG. 23 is a flowchart showing the processes of the image analysis apparatus according to a fourth embodiment.

As shown in FIG. 23, in the fourth embodiment, a step S41 is added to replace step S37, as compared with the process of the third embodiment shown in FIG. 18. The image analysis apparatus 10 of the fourth embodiment also includes a communication unit 16 similar to the second embodiment shown in FIG. 17A, and communicates with the host computer 30 via the communication unit 16. The storage unit 31 of the host computer 30 stores test subject information in advance in association with the sample ID. The other structures of the fourth embodiment are similar to that of the third embodiment.

As shown in FIG. 23, in step S41 the processing unit 11 acquires information on chromosome abnormality from the host computer 30. In this case, in step S41 the processing unit 11 acquires the subject information from the host computer 30 based on the sample ID received in step S31. Then, in step S38, the processing unit 11 performs analysis based on information on chromosome abnormality. In this case, in step S38 the processing unit 11 performs analysis based on the subject information by using the composite image generated in step S33. In step S39 the processing unit 11 causes the display unit 13 to display a screen 440 including the analysis result generated in step S38.

According to the fourth embodiment, subject information is acquired from the host computer 30 when the operator inputs a reanalysis instruction after the first analysis. In this way it is possible to perform the second analysis quickly.

Fifth Embodiment

Figure 24:
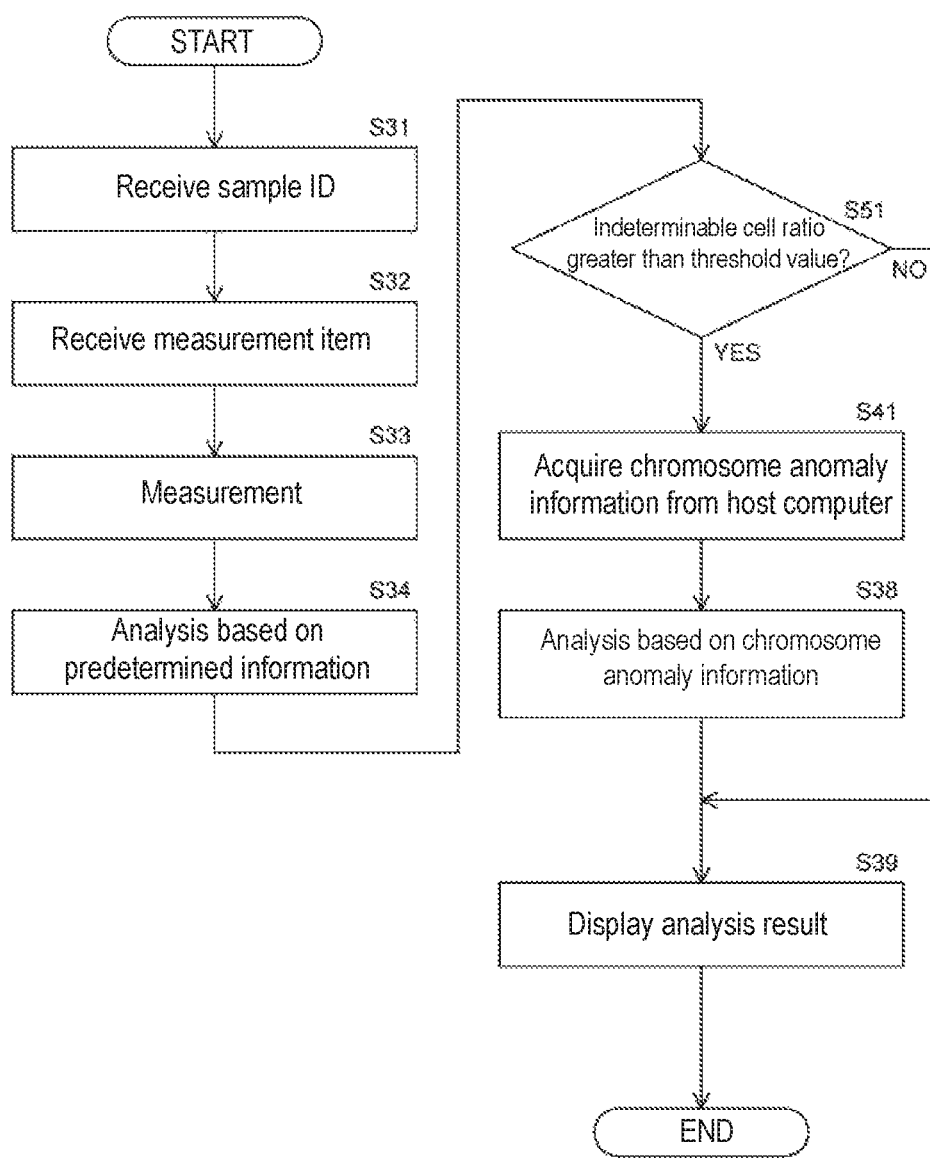
FIG. 24 is a flowchart showing the processes of the image analysis apparatus according to a fifth embodiment.

As shown in FIG. 24, in the fifth embodiment, step S35 is omitted, and step S51 is added to replace step S36, as compared with the processing of the fourth embodiment shown in FIG. 23. The other structures of the fifth embodiment is the same as that of the fourth embodiment.

As shown in FIG. 24, when analyzing in step S34, the processing unit 11 performs the process of step S51 without displaying the analysis result. In step S51 the processing unit 11 determines whether the number of indeterminable cells or the indeterminable cell ratio is greater than a predetermined value based on the analysis result of step S34.

When the number of indeterminable cells or the indeterminable cell ratio is equal to or less than the predetermined value, the processing unit 11 determines that the analysis performed in step S34 is appropriate, and advances the process to step S39. Then, in step S39 the processing unit 11 causes the display unit 13 to display a screen including the analysis result generated in step S34. In this case, the screen displayed on the display unit 13 is the same as the screen 410 shown in FIG. 15.

On the other hand, if the number of indeterminable cells or the indeterminable cell ratio is larger than a predetermined value, the processing unit 11 determines that the analysis performed in step S34 was inappropriate and advances the process to step S41. In step S41, the processing unit 11 acquires subject information from the host computer 30 and performs analysis based on the subject information in step S38. In step S39, the processing unit 11 causes the display unit 13 to display a screen including the analysis result generated in step S38. In this case, the screen displayed on the display unit 13 is the same as the screen 440 shown in FIG. 20.

According to the fifth embodiment, after the first analysis, the first analysis result is displayed if the first analysis is appropriate. On the other hand, if the first analysis is inappropriate, a second analysis is performed and the second analysis result is displayed. In this way quick and appropriate analysis results can be displayed.

OTHER EMBODIMENTS

Although the processing unit 11 acquires, as the subject information, the past examination results of the subject, the name of the disease affecting the subject, or the presence or absence of bone marrow transplant between opposite sexes in the above-described embodiments, the subject information acquired by the unit 11 is not limited to this. The subject information also may include, for example, information indicating whether a past examination result of the subject is a result of examination based on the G band staining method, information on past examinations of the subject based on FISH method, the purpose of the examination, the presence or absence of the examination history, the presence or absence of congenital abnormality or the like. The purpose of the examination includes initial examination, examination upon remission, examination at the time of recurrence, examination at the time of treatment and the like.

What is claimed is:

1. An image analysis apparatus comprising:
   a light source configured to irradiate light on a sample of a subject, the sample containing a cell having labeled target sites in different colors;
   an imaging unit configured to:
   capture light from the labeled target site irradiated by the light source and generate an image of a cell comprising at least one bright spot of a plurality of bright spots corresponding to the labeled target sites; and
   a processing unit configured to process the image generated by the imaging unit by counting the bright spots for each of the colors in the image, comparing a combination of numbers of bright spots in different colors with a reference combination that is selected based on information of the subject, and determining that the cell in the image is an abnormal cell when the combination of numbers of bright spots in the image matches with the selected reference combination, wherein the reference combination includes a number of a bright spot of a first color, a number of a bright spot of a second color, and a number of a bright spot in which the bright spot of the first color overlaps with the bright spot of the second color,
   wherein the processing unit acquires the information of the subject and selects one of a plurality of combinations as the reference combination, the plurality of combinations including:
   a first combination corresponding to the information of the subject indicating that the subject does not have a predetermined chromosomal abnormality; and
   a second combination corresponding to the information of the subject indicating that the subject has the predetermined chromosomal abnormality.

2. The image analysis apparatus according to claim 1, wherein the processing unit analyzes the cell based on a combination of the bright spots corresponding to the plurality of the target sites in the image and the acquired information of the subject, wherein the cell has a plurality of the target sites.

3. The image analysis apparatus according to claim 1, wherein the information of the subject comprises a past examination result of the subject.

4. The image analysis apparatus according to claim 1, wherein the information of the subject comprises a disease name of the subject.

5. The image analysis apparatus according to claim 1, wherein the information of the subject comprises information indicating whether a performed transplantation caused a change in a chromosome of the subject.

6. The image analysis apparatus according to claim 1, wherein the information of the subject comprises chromosomal abnormality.

7. The image analysis apparatus according to claim 2, wherein the combination of the bright spots comprises a combination of the color and the number of the bright spots.

8. The image analyzing apparatus according to claim 2 further comprising:
a storage unit that stores the plurality of combinations,
wherein the processing unit selects the reference combination corresponding to the information of the subject from the plurality of combinations, and determines an analysis result of the cell based on the selected reference combination.

9. The image analysis apparatus of claim 8, wherein
the storage unit stores combinations of the bright spots for each measurement item; and
the processing unit selects the reference combination corresponding to the measurement item and the information of the subject, and determines an analysis result of the cell based on the selected reference combination.

10. The image analysis apparatus according to claim 1, further comprising:
a display unit;
wherein the processing unit causes the display unit to display a subject information receiving screen for receiving the information of the subject, and acquires the information of the subject via the subject information receiving screen.

11. The image analysis apparatus according to claim 1, further comprising:
a communication unit for communicating with an external computer that stores the information of the subject;
wherein the processing unit acquires the information of the subject from the external computer via the communication unit.

12. The image analysis apparatus according to claim 1, wherein
the processing unit analyzes the cell and determines whether the cell is abnormal.

13. The image analysis apparatus according to claim 12, wherein
the processing unit determines whether the cell is abnormal based on whether a combination of bright spots corresponding to the labeled target site in the image matches a combination of bright spots corresponding to abnormal or normal cases corresponding to the information of the subject.

14. The image analysis apparatus according to claim 1, further comprising:
a display unit;
wherein the processing unit calculates a number or a ratio of abnormal cells in the sample and causes a calculation result to be displayed on the display unit.

15. The image analysis apparatus according to claim 6, further comprising:
a display unit;
wherein the processing unit
analyzes each of a plurality of cells included in the sample;
calculates a number or a ratio of the cells that do not match the combination of the bright spots in both abnormal and normal cases; and
displays a reanalysis acceptance screen for accepting an instruction to reanalyze an analyzed cell; and
the analyzed cell is reanalyzed based on the information of the subject in response to an acceptance of the instruction for reanalysis.

16. An image analysis method comprising:
irradiating light on a sample of a subject, the sample containing a cell having labeled target sites in different colors;
capturing light from the irradiated labeled target site;
generating an image of a cell comprising at least one bright spot of a plurality of bright spots corresponding to the labeled target sites;
processing the generated image by counting the bright spots for each of the colors in the image, comparing a combination of numbers of bright spots in different colors with a reference combination that is selected based on information of the subject, and determining that the cell in the image is an abnormal cell when the combination of numbers of bright spots in the image matches with the selected reference combination, wherein the reference combination includes a number of a bright spot of a first color, a number of a bright spot of a second color, and a number of a bright spot in which the bright spot of the first color overlaps with the bright spot of the second color; and
acquiring the information of the subject and selecting one of the plurality of combinations as the reference information, the plurality of combinations including:
a first combination corresponding to the information of the subject indicating that the subject does not have a predetermined chromosomal abnormality; and
a second combination corresponding to the information of the subject indicating that the subject has the predetermined chromosomal abnormality.

* * * * *